United States Patent
Moudy et al.

(10) Patent No.: US 10,642,655 B2
(45) Date of Patent: May 5, 2020

(54) REAL-TIME PARTITIONED PROCESSING STREAMING

(71) Applicant: Pearson Education, Inc., New York, NY (US)

(72) Inventors: Christopher Moudy, Chandler, AZ (US); Kevin Berns, North Liberty, IA (US)

(73) Assignee: PEARSON EDUCATION, INC., New York, NY (US)

( * ) Notice: Subject to any disclaimer, the term of this patent is extended or adjusted under 35 U.S.C. 154(b) by 145 days.

(21) Appl. No.: 15/882,599

(22) Filed: Jan. 29, 2018

(65) Prior Publication Data

US 2018/0150329 A1    May 31, 2018

Related U.S. Application Data

(63) Continuation of application No. 14/806,755, filed on Jul. 23, 2015, now Pat. No. 9,940,169.

(51) Int. Cl.
    *G06F 15/16* (2006.01)
    *G06F 9/50* (2006.01)
(52) U.S. Cl.
    CPC .................. *G06F 9/5027* (2013.01)
(58) Field of Classification Search
    CPC .................................................. G06F 9/5027
    USPC .................................................. 709/201, 231
    See application file for complete search history.

(56) References Cited

U.S. PATENT DOCUMENTS

| | | |
|---|---|---|
| 6,985,516 B1 | 1/2006 | Easton et al. |
| 7,418,715 B2 | 8/2008 | Pereira |
| 8,938,767 B2 | 1/2015 | Chen et al. |
| 9,288,159 B2 | 3/2016 | Hutt et al. |
| 9,444,700 B2 | 9/2016 | Lawrie et al. |
| 2005/0081200 A1 | 4/2005 | Rutten et al. |
| 2013/0297618 A1 | 11/2013 | Chandrasekaran et al. |
| 2014/0063259 A1 | 3/2014 | Rhodus et al. |
| 2016/0182380 A1 | 6/2016 | Mehra et al. |
| 2016/0378614 A1 | 12/2016 | Thanasekaran |
| 2017/0026441 A1 | 1/2017 | Moudy et al. |

OTHER PUBLICATIONS

Notice of Allowance for U.S. Appl. No. 14/806,755 dated Dec. 28, 2017, 22 pages.
Hortonworks. "Apache Storm." Hortonworks, Inc. Jun. 25, 2014. Retrieved fromhttp:/1web.archive.org/web/20140625210401/http:/hortonworks.com/hadoop/storm/] on Aug. 11, 2015, 4 pages.
Hortonworks. "Hadoop YARN." Hortonworks, Inc. Jun. 25, 2014. Retrieved from[http:lweb.archive.org/web/20140625234326/http:/hortonworks.com/hadoop/yarn/] on Aug. 11, 2015, 5 pages.

(Continued)

*Primary Examiner* — Madhu Woolcock
(74) *Attorney, Agent, or Firm* — Quarles and Brady LLP

(57) ABSTRACT

Embodiments related to processing data sets in real-time by using a distributed network to generate and process partitioned streams. Messages are assigned to partition streams. Within each stream, each of a set of processors perform a designated task. Results from the task are transmitted (directly or indirectly) to another processor in the stream. The distributed and ordered processing can allow results to be transmitted while or before the results are stored.

18 Claims, 15 Drawing Sheets

(56) References Cited

OTHER PUBLICATIONS

Apache Kafka. "Kafka 0.8.1 Documentation." kafka.apache.org. Jul. 13, 2014. Retrieved from [http:/lweb.archive.org/web/20140713125126/http:/kafka.apache.org/documentation.html] on Aug. 11, 2015, 58 pages.

Samza. "Background." samza.apache.org. Jun. 21, 2014. Retrieved from [http://web.archive.org/web/20140621131437 /http:/samza.incubator.apache.org/learn/documentation/O.7.O/introductio n/background.html] on Aug. 11, 2015, 1 page.

REAL-TIME PARTITIONED PROCESSING STREAMING

CROSS-REFERENCE OF RELATED APPLICATIONS

This application is a continuation of U.S. Non-Provisional application Ser. No. 14/806,755, filed on Jul. 23, 2015 and entitled "REAL-TIME PARTITIONED PROCESSING STREAMING", which is herein incorporated by reference in its entirety for all purposes.

FIELD

This disclosure relates in parallel processing streaming of partitioned data

BACKGROUND

In the era of big data, entities are struggling to identify how to process the data and how to ensure that the processing can handle scaling. While parallel processing can facilitate scaling, such processing becomes complicated when the processing includes tasks that rely on results from multiple data sets.

SUMMARY

In some embodiments, a system is provided for processing data sets in real-time by using a distributed network to generate and process partitioned streams. The system includes a message allocator that receives a plurality of data sets from one or more producer devices. For each of the plurality of data set, the message allocator also identifies a tag or characteristic of the data set; identifies an initial partition stream from amongst a plurality of initial partition streams that corresponds to the tag or characteristic; and appends the data set to the initial partition stream, such that the data set is associated with a rank that is higher than other ranks associated with other data sets in the initial partition stream. The system also includes a partition controller that, for an initial partition stream of the plurality of initial partition streams, manages a set of task processors such that: each task processor in the set of task processors is designated to perform a task in a workflow so as to process data sets in the initial partition stream or a processed versions of the data sets in a processed version of the initial partition stream in an order that corresponds to the ranks. The set of task processors includes: a first task processor designated to perform a first task; a second task processor designated to perform a second task; and a third task processor designated to perform a third task. The first task processor in the set of task processors is controlled so as to: generate, via performance of the first task, processed data sets corresponding to data sets in the initial partition stream; facilitate storing the processed versions of the data sets at a first data store; generate a processed partition stream that includes the processed versions of data sets in the initial partition stream; and facilitate routing the processed partition stream for further processing of the processed data sets in accordance with one or more other task. The second task processor in the set of task processors is controlled so as to: generate, via performance of the second task, a score corresponding to each data set in the initial partition stream; and facilitate storing the scores at a second data store. The third task processor in the set of processors is controlled so as to repeatedly retrieve a plurality of scores from the second data store, each score in the plurality of scores; generate, via performance of the third task, a real-time analytic variable based on the plurality of scores; and facilitate availing the real-time analytic variable to a client device. Repeated retrieval of the plurality of scores and repeated generation of the real-time analytic variable enables the real-time analytic variable to be updated in response to appending and task-performance processing of new data appended to the initial partition stream.

In some embodiments, a method is provided for processing data sets in real-time by using a distributed network to generate and process partitioned streams. At a message allocator, a plurality of data sets is received from one or more producer devices. For each of the plurality of data set, and at the message allocator: a tag or characteristic of the data set is identified; an initial partition stream from amongst a plurality of initial partition streams is identified that corresponds to the tag or characteristic; and the data set is appended to the initial partition stream, such that the data set is associated with a rank that is higher than other ranks associated with other data sets in the initial partition stream. For an initial partition stream of the plurality of initial partition streams: a set of task processors is managed such that each task processor in the set of task processors is designated to perform a task in a workflow so as to process data sets in the initial partition stream or a processed versions of the data sets in a processed version of the initial partition stream in an order that corresponds to the ranks. The set of task processors includes: a first task processor designated to perform a first task; a second task processor designated to perform a second task; and a third task processor designated to perform a third task. The first task processor in the set of task processors is controlled so as to generate, via performance of the first task, processed data sets corresponding to data sets in the initial partition stream; facilitate storing the processed versions of the data sets at a first data store; generate a processed partition stream that includes the processed versions of data sets in the initial partition stream; and facilitate routing the processed partition stream for further processing of the processed data sets in accordance with one or more other tasks. The second task processor in the set of task processors is controlled so as to generate, via performance of the second task, a score corresponding to each data set in the initial partition stream; and facilitate storing the scores at a second data store. The third task processor in the set of processors is controlled so as to repeatedly: retrieve a plurality of scores from the second data store, each score in the plurality of scores; generate, via performance of the third task, a real-time analytic variable based on the plurality of scores; and facilitate availing the real-time analytic variable to a client device. Repeated retrieval of the plurality of scores and repeated generation of the real-time analytic variable enables the real-time analytic variable to be updated in response to appending and task-performance processing of new data appended to the initial partition stream.

In some embodiments, a computer program product is provided that is tangibly embodied in a non-transitory machine-readable storage medium. The computer program product includes instructions configured to cause one or more data processors to perform actions including part or all of a method disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
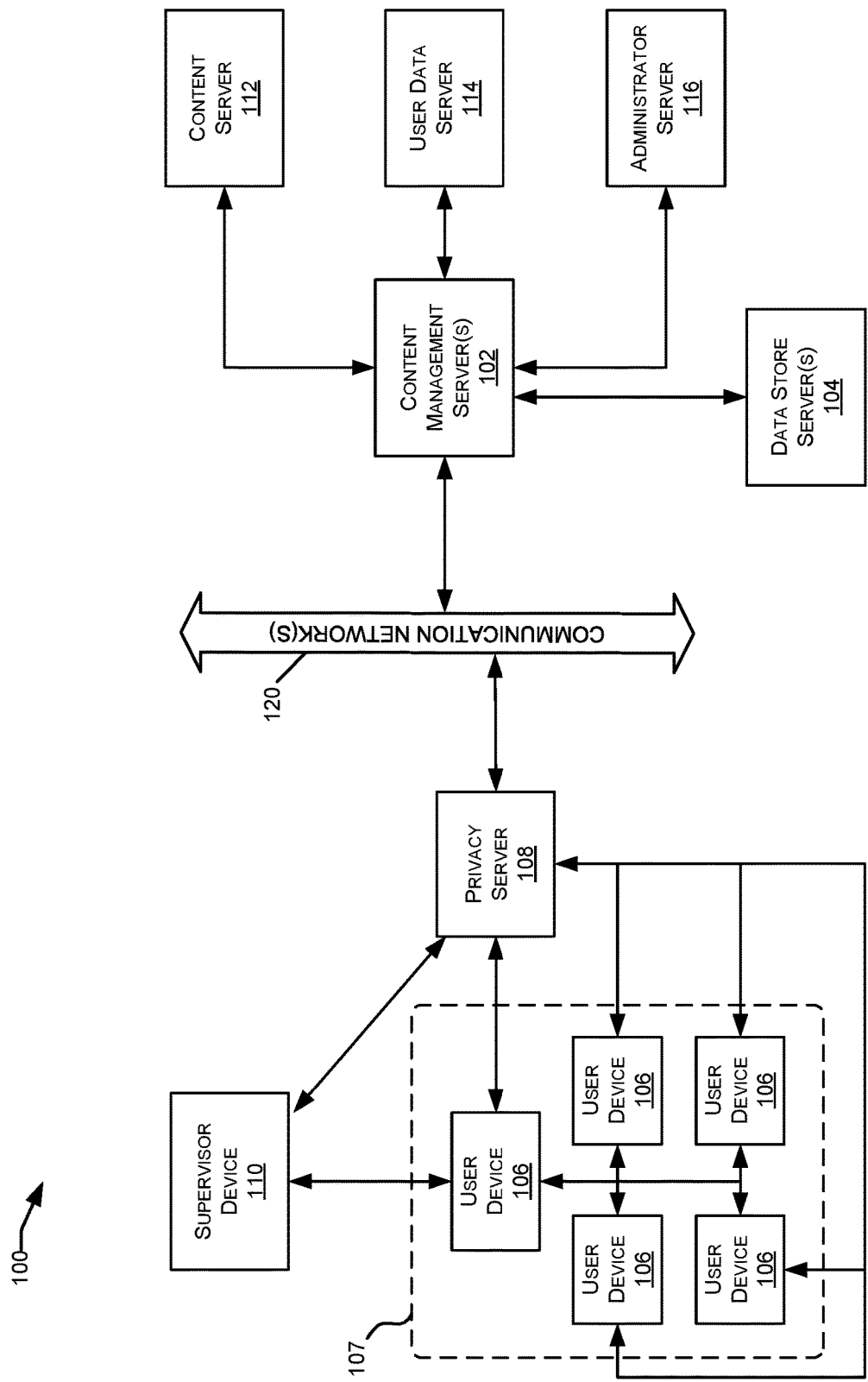
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 (e.g., electronic user devices) and/or supervisor devices 110 (e.g., electronic supervisor devices). User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
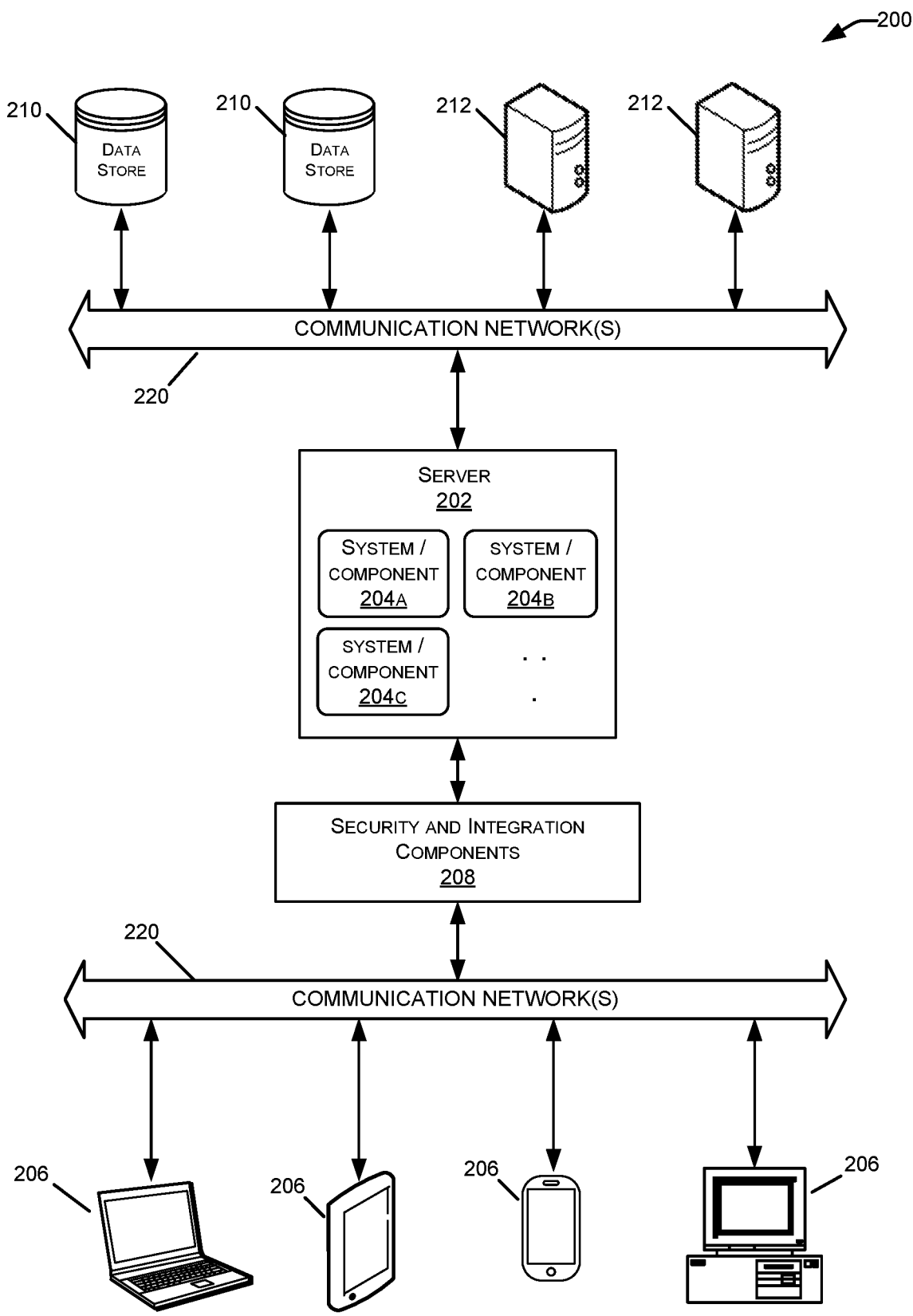
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture. In one instance, computer server 202 may correspond to a relay device. In one instance, computer server 202 may correspond to a distributed system, such as one that resides in part at a relay device and in part at a remote content management server 102 (e.g., in a cloud).

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
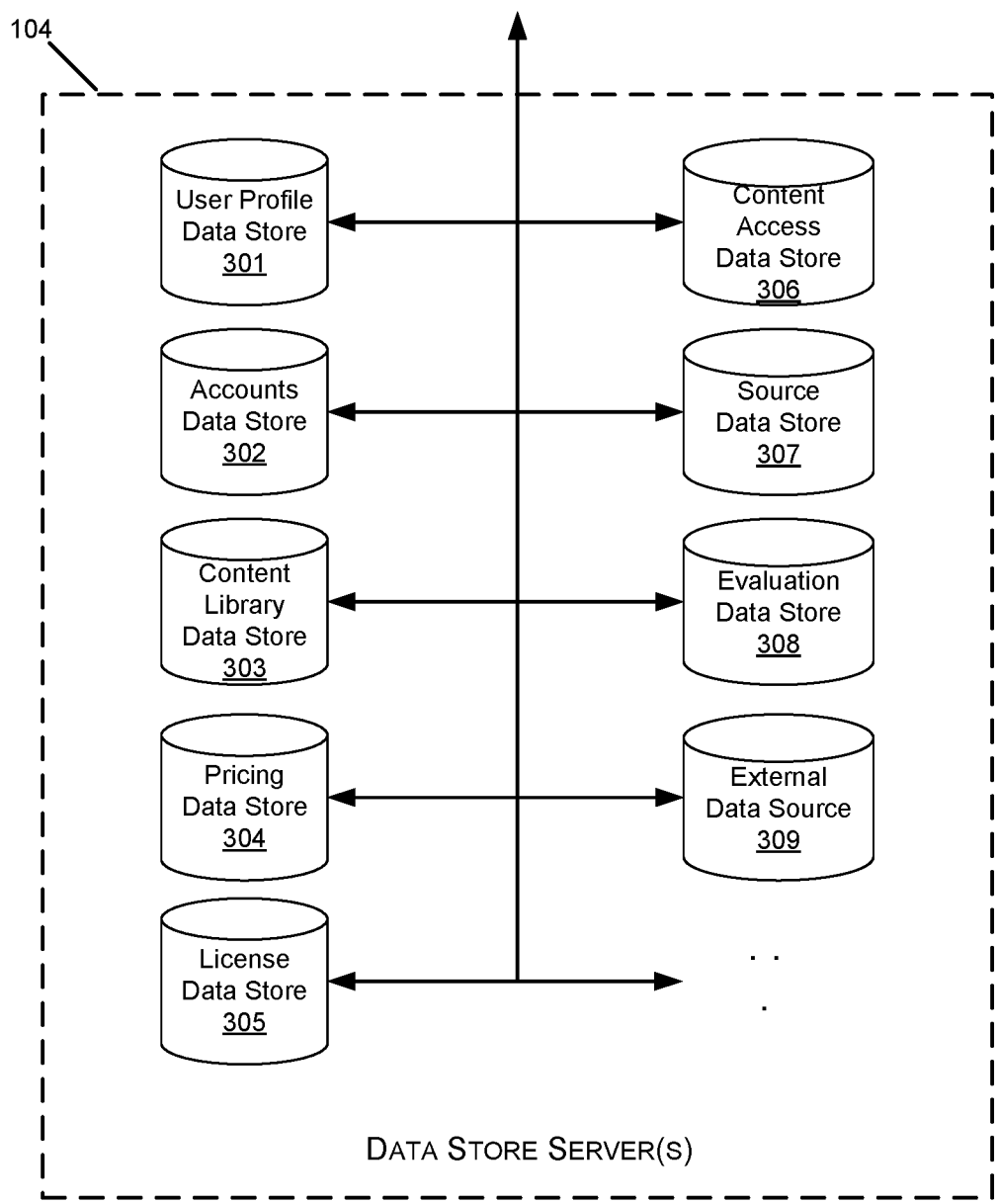
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

In one instance, some or all of data stores 301-309 reside in storage on a remote server 104 and a corresponding data store for each of at least one of data stores 301-309 or another data store reside in a relay device. Thus, the relay device may receive data from the remote server and store the data locally (e.g., to facilitate subsequent transmission to a user device). Similarly, a corresponding data store for at least one of data stores 301-309 or another data store may reside at a user device 106. For example, a content management server 102 may provide select data from evaluation data store 308 to a relay device (which can store the data in a corresponding data store), which can transmit some or all of the data to a user device.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
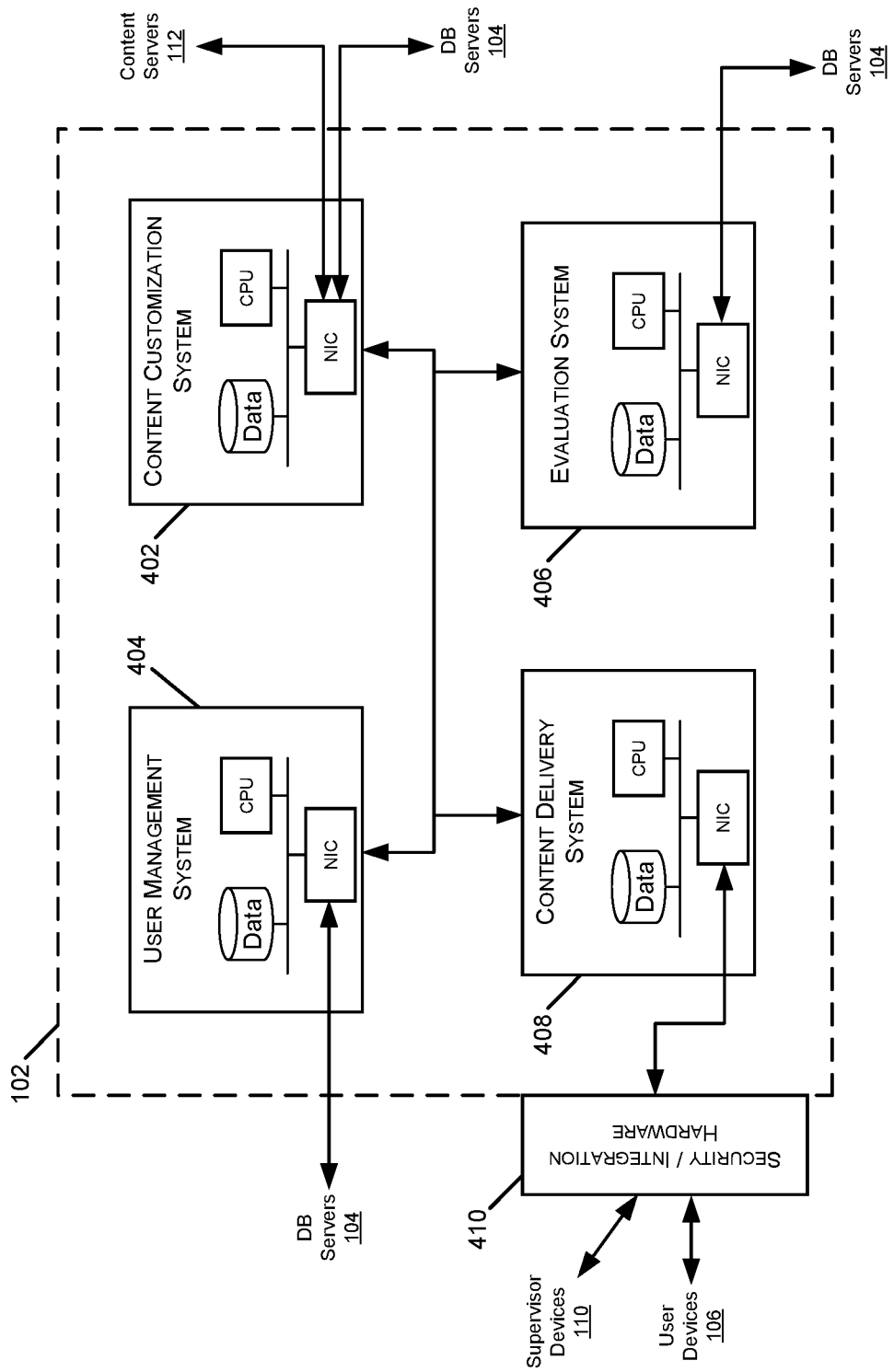
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102.

It will be appreciated that, though FIG. 4 shows content management server 102 as including content customization system 402, user management system 404, evaluation system 406 and content delivery system 408, one or more of the systems (or corresponding or similar systems) may also or alternatively reside on a different device. For example, a user device (e.g., executing an executable file) and/or relay device may include an evaluation system, and/or a relay device may include a user management system 404 and/or content delivery system 408.

In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
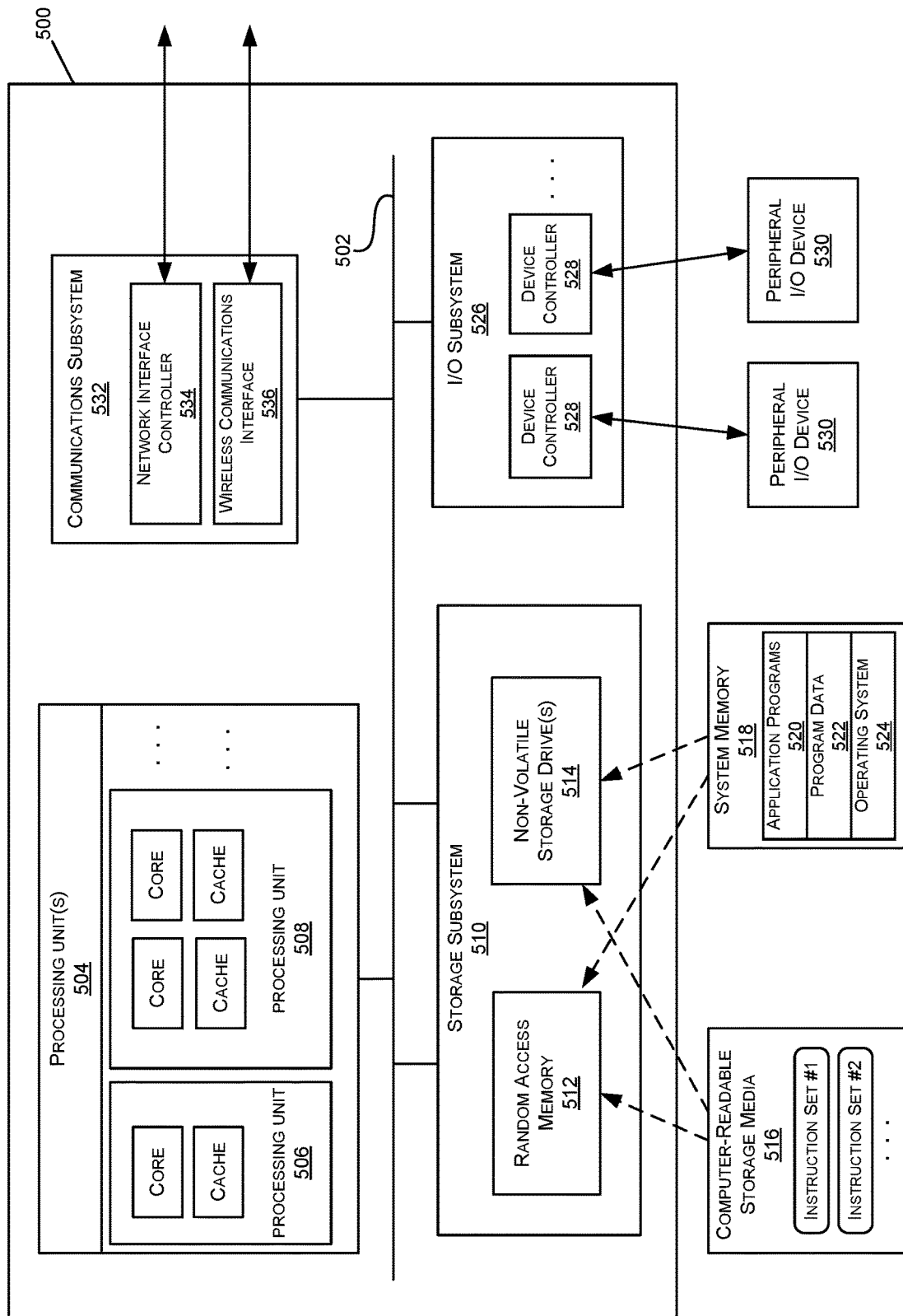
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
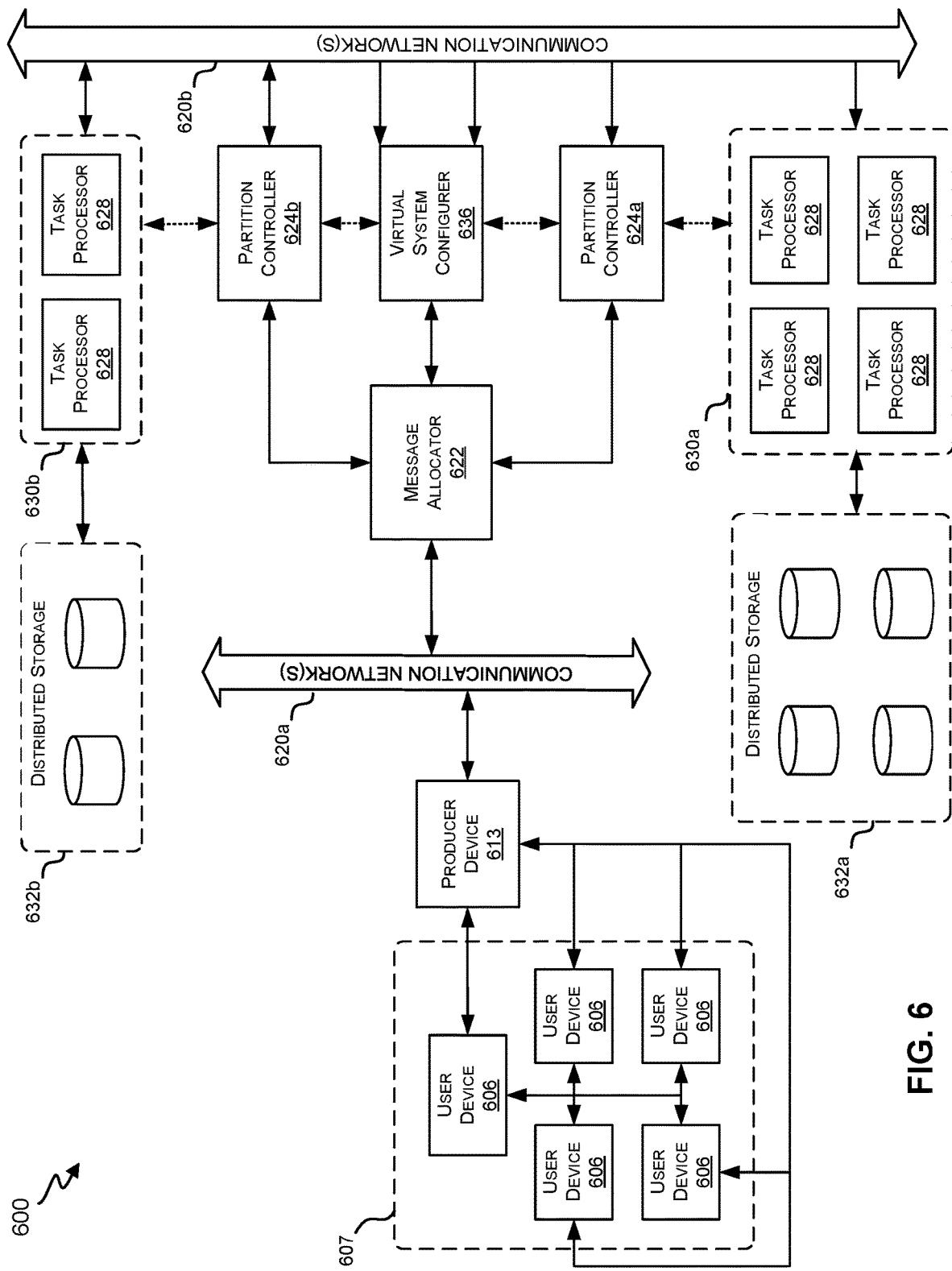
FIG. 6 depicts a block diagram of an embodiment of a data processing network.

Referring next to FIG. 6, a block diagram is shown illustrating various components of a data processing network 600 which implements and supports certain embodiments and features described herein. It will be appreciated that data processing network 600 can operate in conjunction with other networks, such as content distribution network 100. For example, data processed by data processing network 600 may include data from user devices generated in response to content presented the user device delivered via content distribution network 100.

Data processing network 600 also may include one or more user devices 106 (e.g., electronic user devices), which may generate data for processing by one or more other components of data processing network 600. User devices 606 may, but need not, include devices such as user devices 106 in CDN 100 that receive distributed content and that support various types of user interactions with the content. User devices 606 may transform locally received user input into data to be transmitted via one or more communications that include content corresponding to such input.

At least some of the communications transmitted from user devices 606 may be transmitted to a producer device 613. In some instances, a producer device 613 includes a supervisor device, such as supervisor device 110 from content distribution network 100. In some instances, a producer device is associated with a particular geographic location and/or institution (e.g., a school server). Producer device 613 may be configured to relay, aggregate, process and/or transform data from user-device communications. In some instances, producer device 613 may be configured so as to generate a communication that includes content from a user-device communication and additional data (e.g., a query-set identifier, entity identifier, geographic location, key and/or producer-device identifier).

User devices 606 and/or producer device 613 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 606 and/or producer devices 613 may be general purpose personal computers or special-purpose computing devices including, by way of example, personal computers, laptop computers, workstation computers, projection devices, and interactive room display systems. Additionally, user devices 606 and/or producer devices 613 may be any other electronic devices, such as a thin-client computers, an Internet-enabled gaming systems, business or home appliances, and/or a personal messaging devices, capable of communicating over one or more networks.

User devices 606 and/or producer devices 613 may correspond to one or more types of specialized devices, such as those described with respect to content delivery network 100. In some embodiments, user devices 606 and producer devices 613 may operate in the same physical region (e.g., within physical location 107). In such cases, the devices may contain components that support direct communications with other nearby devices, such as a wireless transceivers and wireless communications interfaces, Ethernet sockets or other Local Area Network (LAN) interfaces, etc. In other implementations, the user devices 606 and producer devices 613 need not be used at the same location 107, but may be used in remote geographic locations in which each user device 606 and producer device 613 may use security features and/or specialized hardware (e.g., hardware-accelerated SSL and HTTPS, WS-Security, firewalls, etc.) to communicate with other components of data processing network 600 and/or other remotely located user devices 606.

Producer device 613 may generate and/or transmit one or more communications to a message allocator 622 via one or more first communication network 620a. In one instance, producer device 613 generates the one or more communications to include content that reflects content from one or more communications received from one or more user devices 606. For example, a communication may include an identifier of a user device, an identifier of a query (e.g., from content distributed via content distribution network 100) and a response to the query (or an identification thereof). The one or more first communication networks 620a may include, for example, the Internet, a wide-area network, a wired network, a wireless network, a local-area network or other type of network. Communications from producer device 613 may be generated and/or transmitted for example, in response to receiving a new communication from a user device 606, at defined times or time intervals, in response to a request (e.g., from message allocators 622), upon receiving a threshold number of communications, etc.

Message allocator 622 may identify a partition stream that corresponds to a communication. The partition stream may be identified, in accordance with a rule or protocol, based on a source of the communication (e.g., an identification of a particular producer device 613), content in the communication and/or metadata of the communication. For example, the communication may include content or metadata that identifies an entity (e.g., institution, district and/or geographic location) associated with the communication, which may be used to identify the partition stream. In some instances, particular content and/or metadata can be used to identify the partition stream via a look-up table. The look-up table can include one generated based upon, e.g., input (e.g., received at a client device), a schedule (e.g., of content delivery and/or expected data receipt). In some instances, the partition stream may be identified based (e.g., additionally or alternatively) on a load-balancing technique and/or workflow-independence constraints. In some instances, the partition stream may be identified based (e.g., additionally or alternatively) on a tag or characteristic of a data set of corresponding communication, which may identify (for example) a producer device, geographic location, time, corresponding content identifier, query identifier (e.g., question identifier corresponding to a particular content object), entity associated with the producer device, and so on.

Upon identifying a partition stream, message allocator may append at least some or all of a data set of the communication to the stream. The data set can include, for example, one or more responses (e.g., to one or more content-object queries), an identification of each of one or more content-object queries, an identification of a content object, an identification of a user or user device, an identification of a producer device and/or an identification of an entity, association, district and/or location. The partition stream may include on that is continuously streamed to and/or for which content thereof is repeatedly transmitted to a partition controller 624 corresponding to the stream (e.g., partition controller 624a or 624b). For example, a data set appended to the stream may be transmitted to a corresponding partition controller in response to the appending, at a defined time, and/or upon receiving a data request from the partition controller (e.g., which may have been initiated in response to a provision of an indication that such an appending had occurred and/or in response to a detection that processing of another data set in the stream, via one or more workflow tasks, had been completed).

In conjunction with appending the data set to the partition stream, message allocator 622 may assign the data set with a rank. In some instances, a rank of a most recently added data set may be required to be higher than (e.g., and/or higher than by a specified quantity, such as by "1") than any other rank in the stream. Such ranking may facilitate processing data sets in an order corresponding to an order in which data sets were received.

Each of various partition controllers 624 can be configured to route and update partition streams, monitor processing of the streams and/or manage a set of task processors 630 to process data sets in the partition stream. For example, partition controller 624 may manage set of task processors 630 such that each task processor in set of task processors 630 is designated to perform one or more tasks in a workflow. Performance of the one or more tasks can include, for example, processing a data set in a partition stream (e.g., an initial partition stream received from message allocator 622 or a processed version thereof). In some instances, set of task processors 630 is managed by partition controller 624 such that a single task processor is to process a data set in accordance with a particular task in a workflow. In some instances, multiple task processors are designated to perform a same at least part of a given task. Partition controller 624 can designate task performance to particular task processors by using, at least in part, a load-balancing technique and/or reduced-latency technique (e.g., so as to reduce bottlenecks in an overall performance of a workflow including a set of tasks).

In some workflows, a result from a performance of each of one or more first tasks that use one or more data sets (or processed versions thereof) may be used to perform a second task. Accordingly, one or more inter-task streams may be generated and/or updated to include these results. For example, an initial partition stream may include Data Sets 1-10, and task processor may sequentially process each data set. Upon completion of processing each data set, the data set may be removed from the initial partition stream, and a result corresponding to a processing of the data set can be appended to an inter-task stream. The inter-task stream can then be streamed to a task processor performing the second task. In some instances, the task processor(s) performing the first task(s) generate, update and/or provide the inter-task stream to the task processor performing the second task. Suh direct communications may be facilitated by periodic communications provided by partition controller 624 to one or more task processors 628 that identify a configuration of set of processors 630 and/or transmission instructions. In some instances, the task processor(s) performing the first task(s) provide results of the first task(s) to partition controller 624, which then itself generates, updates and/or provides the inter-task stream based on the results.

Each of one, some or all task processors 628 may be configured to store results of a task performance in a data store. A result may be stored after or while the result is also being transmitted to a destination (e.g., another task processor or partition controller). Accordingly, the result can be used in another task even before the result is stored. The data store can include a virtual data store, data-store partition, a storage on a same device as the task processor, a drive, magnetic tape, etc. In one instance, results from performance of various tasks in a workflow are stored in a distributed storage system 632, such as Hadoop Distributed File System. In one instance, a task processor 628 locally stores results of a task performance, yet the inclusion of multiple task processors in a set 630 can result in data from a workflow processing being distributed.

Various types of data (e.g., result types and/or pertaining to different partitioned streams) can be stored at different parts of the system. For example, distributed storage system 632 may include multiple data stores, with each data store including a drive, flash memory, ROM, RAM, data-store servers, etc. Data may be stored in a structured, relational, object-oriented, unstructured and/or indexed manner. Data may be managed by a data store management system, such as Apache Cassandra. Data may be redundantly stored and/or replicated across multiple data stores (e.g., included as part of multiple datacenters).

Partition controller 624 and/or message allocator 622 may use various techniques to distribute workloads across various processors. In some instances, message allocations, partition definitions, assignment of tasks to processors, scheduling of tasks, configuration of sets of processor, and so on are supported by Hadoop YARN and/or MapReduce. Further routing of data sets (or processed versions thereof) from message allocator 622 to one or more partition controllers 624, from partition controllers 624 to one or more task processors 628 and/or between task processors 628 may be performed using a messaging system, such as Apache Kafka and/or using an ordered commit log configured to ensure that each data set (or processed version thereof) is processed in a particular manner once and only once.

Partition controller 624 can monitor various processing characteristics, such as a processing duration (e.g., a time spent processing a defined number of data sets in a partition stream in accordance with one or more processing tasks a task processor is designated to perform); and/or a latency (e.g., a time from which a data set is received from a producer device or from which it is added to a partition stream to a time at which a particular processing has been performed). Partition controller 624 can further or additionally monitor one or more load characteristics, such as a number and/or size of data sets being received from one, more or all producer devices during a particular time period; and/or a size of one or more partition streams (e.g., representing a quantity and/or size of data sets or processed versions thereof not having undergone particular processing).

Based on the monitoring, partition controller 624 may adjust a configuration of set of task processors 630. For example, partition controller 624 may change a size of set 630 by adding or removing task processors 630 and/or partition controller 624 may change task designations. In one instance, if a particular task processor 628 (e.g., associated with an above-threshold or greatest-in-the-set backlog or processing time) is assigned multiple tasks, one or more of those tasks may be reassigned to another task processor (already in the set of processors or newly added to the set). Alternatively or additionally, a single task assigned to the task processor may be divided into multiple sub-tasks, and one or more sub-tasks can be assigned to another task processor. In one instance, a task processor 628 may be added to the set and assigned a task that is also assigned to another processor in the set. The processors may then, for example, share a load associated with the task via a task-assignment protocol, such as a round-robin technique.

In addition to and/or instead of dynamically adjusting sets of task processors 630 via partition controller 624, partitioning characteristics may be dynamically adjusted via message allocator 622. For example, if a processing latency or queue is high for a first partition subsystem and not a second partitioning subsystem, message allocator 622 may assess the workflows of the partitions to determine whether some of the processing (e.g., whether processing of particular types of data sets) assigned to the first partition subsystem may be reassigned to the second partition subsystem. Such reassignment would require that tasks in a workflow for the first partition subsystem not require results of the processing to be reassigned. Further, the assessment may depend on processing constraints and/or targets. For example, if a target latency for the second partitioning subsystem is substantially shorter than that for the first partitioning subsystem, the reassignment may be avoided. Message allocator 622 may also determine whether to add or remove a partition based on similar types of analyses. As one illustration, a target time period for that between receiving a data set and having completed a processing of the data set through a workflow may be 1, 5, 15, 30 or 60 minutes.

Each task processor 628 in a set can include, for example, a virtual server or virtual instance that may operate in a cloud computing platform. Accordingly, adding a task processor to a set may include creating or spinning up a virtual machine. Thus, task processors to be included in a set or in data processing network 600 may be elastic in terms of compute units and processing capabilities. To change a size or configuration of a set of task processors 630 or to add or remove a set, partition controller 624 and/or message allocator 622 can communicate with virtual system configurer 636, which can facilitate such changes. Specifically, virtual system configurer 636 can generate and transmit communications with requests for or instructions to modify a virtual system in a particular manner (e.g., to provide processing instructions to a particular identified task processor; to gain access to a new virtual instance or server having particular specifications; etc.). Such communications can be transmitted to, for example, a host of a cloud computing system.

It will be appreciated, however, that in some instances, one, more or all task processors may include non-virtual processors. For example, a task processor may include, be part or may correspond to: a server (e.g., a rack server, a tower server, a miniature server, a blade server, a mini rack server, a mobile server, an ultra-dense server, a super server, or the like), a server farm, a computing cluster, or a partition on a device or system.

In the depiction of FIG. 6, sets of task processors 630a, 630b, partition controllers 624a, 624b and virtual system configurer 636 are connected to communication network(s) 620b. Communication network(s) 620b may include, for example, the Internet, a wide-area network, a wired network, a wireless network, a local-area network or other type of network. In some instances, communication network(s) 620a and communication network(s) 620b include a same network or same network type. It will be appreciated that, in some instances, distributed storage 632a and/or 632b may also be connected to a communication network.

It will further be appreciated that each of one or more components of data processing network 600 (e.g., message allocator 622, partition controller 624, virtual server 628, and/or virtual system configurer 636 can include, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, a server farm, a cluster (e.g., of one or more of such devices), etc. Further, each of one or more components of data processing network 600 may act according to stored instructions located in a memory subsystem of the component, and may run an operating system, including any commercially available server operating system and/or any other operating systems discussed herein.

Figure 7:
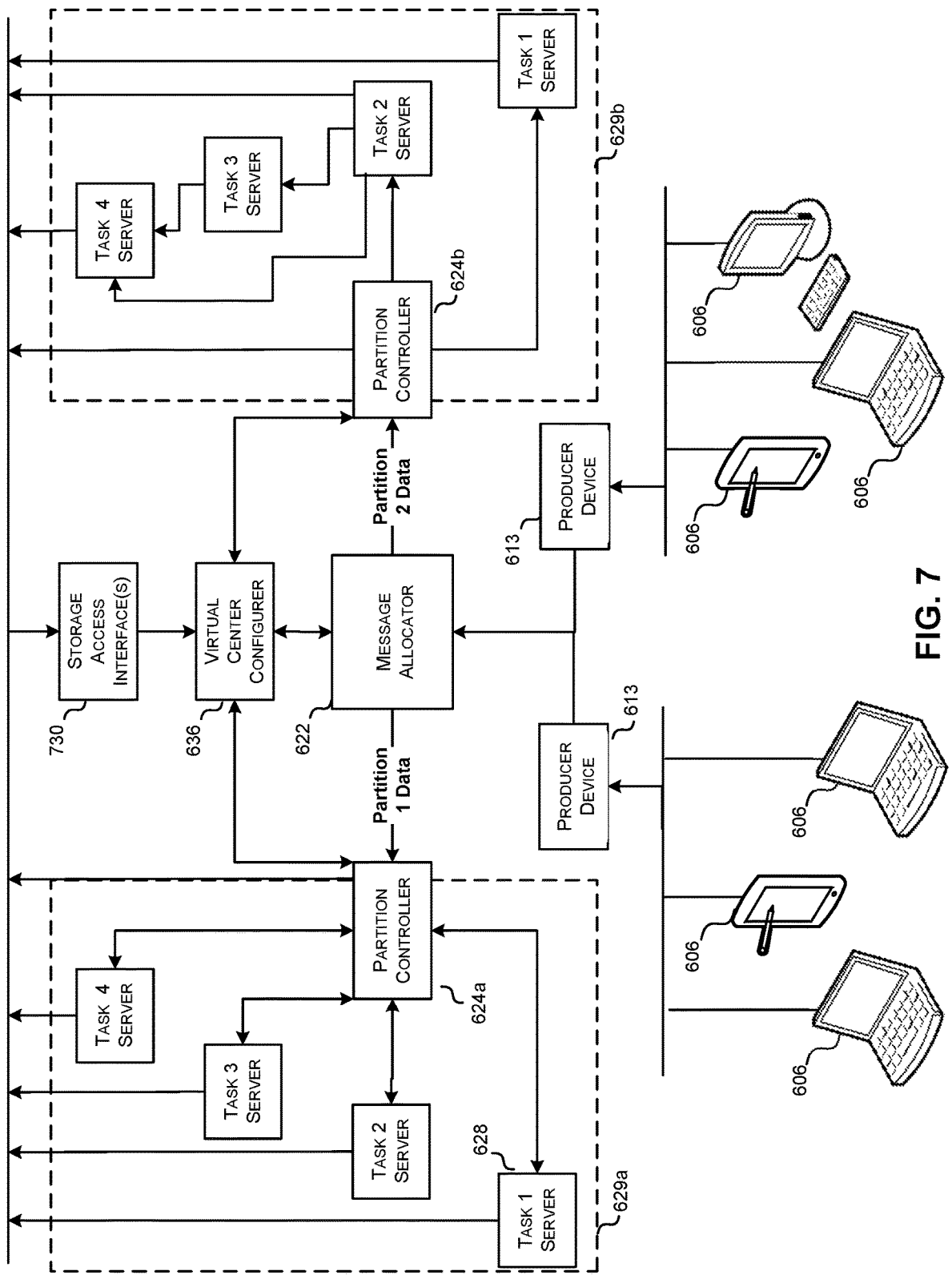
FIG. 7 illustrates an embodiment of a data flow between various components of a data processing network.

Referring next to FIG. 7, a data flow between various components of a data processing network is shown. Each user device 606 may be configured to transmit communications to a corresponding producer device 613, which may be geographically located near the user device or having been one that distributed content corresponding to information in the user-device communications to the user devices. Each producer device may generate a producer-device communication corresponding to one or more user-device communications and transmit the producer-device communication to message allocator 622. The producer-device communication can include one or more data sets. Each data set may correspond to a user device and/or may include one or more responses (e.g., answers identified based on user input). It will be appreciated that, in some instances, user devices 606 may send communications with one or more data sets directly to message allocator 622.

A communication received at message allocator 622 can include one or more data sets, each of which can include (for example) an identifier of a user device, an identifier of a user, an identifier of a producer device, an identifier of an entity associated with the producer device, a response (or multiple responses) to a query (or multiple queries) provided in content that was distributed to a user device (e.g., and presented at the device), an identifier of the query (or of each of the multiple queries), an identifier of the content, and/or a time.

Message allocator 622 can identify which partition controller 624a or 624b of a set of partition controllers (and/or which set of task processors of multiple set of task processors) are to process the one or more data sets from the received communication. The determination can be made based on (for example) the data sets, other content in the communication, metadata of the communication, load-balancing factors (e.g., a current latency, queue length, backlog, etc. of one or more partitions), configurations of sets of task processors associated with each partition controller (e.g., a number of processors, processing capability, etc.), processing workflows associated with the data sets, and/or workflow priorities. In some instances, a tag or characteristic and a partition-routing protocol determines which partition controller is to receive the data set.

Upon identifying a partition controller, message allocator 622 can add a data set (or part thereof and/or processed version thereof) to an initial stream to be provided to the partition controller. Partition controller 624 can then manage a set of task processors 628 to process data sets according to a processing workflow.

FIG. 7 shows two exemplary communication flows within partitions 629a, 629b, though it will be appreciated that other flows are contemplated. In a first partition 629a, each task processor (or task server) is bidirectionally coupled with partition controller 624a. Thus, partition controller 624a can provide each task processor with data needed to perform a task (e.g., via a stream), can monitor performance and can receive results from the processor. Partition controller 624a may then use results to provide another processor with data needed to perform another task (e.g., via an inter-task stream).

Meanwhile, in partition 629b, communication is unidirectional. Results from particular tasks may still be used for other tasks, but this embodiment includes configuring the set of task processors so as to directly transmit results (e.g., via an inter-task stream) from one task processor to another (e.g., from task 2 server to task 3 server and task 4 server or from task 3 server to task 4 server).

All the while, task processors 628 can be storing some or all of the results from the processing. As described herein, the results can be stored locally and/or remotely from the processor. In one instance, a result is stored locally and replicated at another remote data store. A storage access interface 730 may track where particular results are being stored. For example, storage access interface 730 may manage a structure that associated data-set tags, task identifiers and identifiers of data stores that store results of processing of the tasks on the data sets. Accordingly, storage access interface 730 can respond to queries for particular data (e.g., by retrieving the data from a given data store) or for a location (e.g., an address of a data store) where a particular data is stored.

Virtual center configurer 636 can communicate with partition controllers 624a, 624b and message allocator 622 to determine (for example) when and how a processing system is to be modified to better reach processing targets or constraints, to balance processing, etc. Further virtual center configurer 636 can alert partition controller 624a, 624b and/or message allocator 622 when a structure of a system is changed such that appropriate transmissions and/or configurations can be adjusted.

Figure 8:
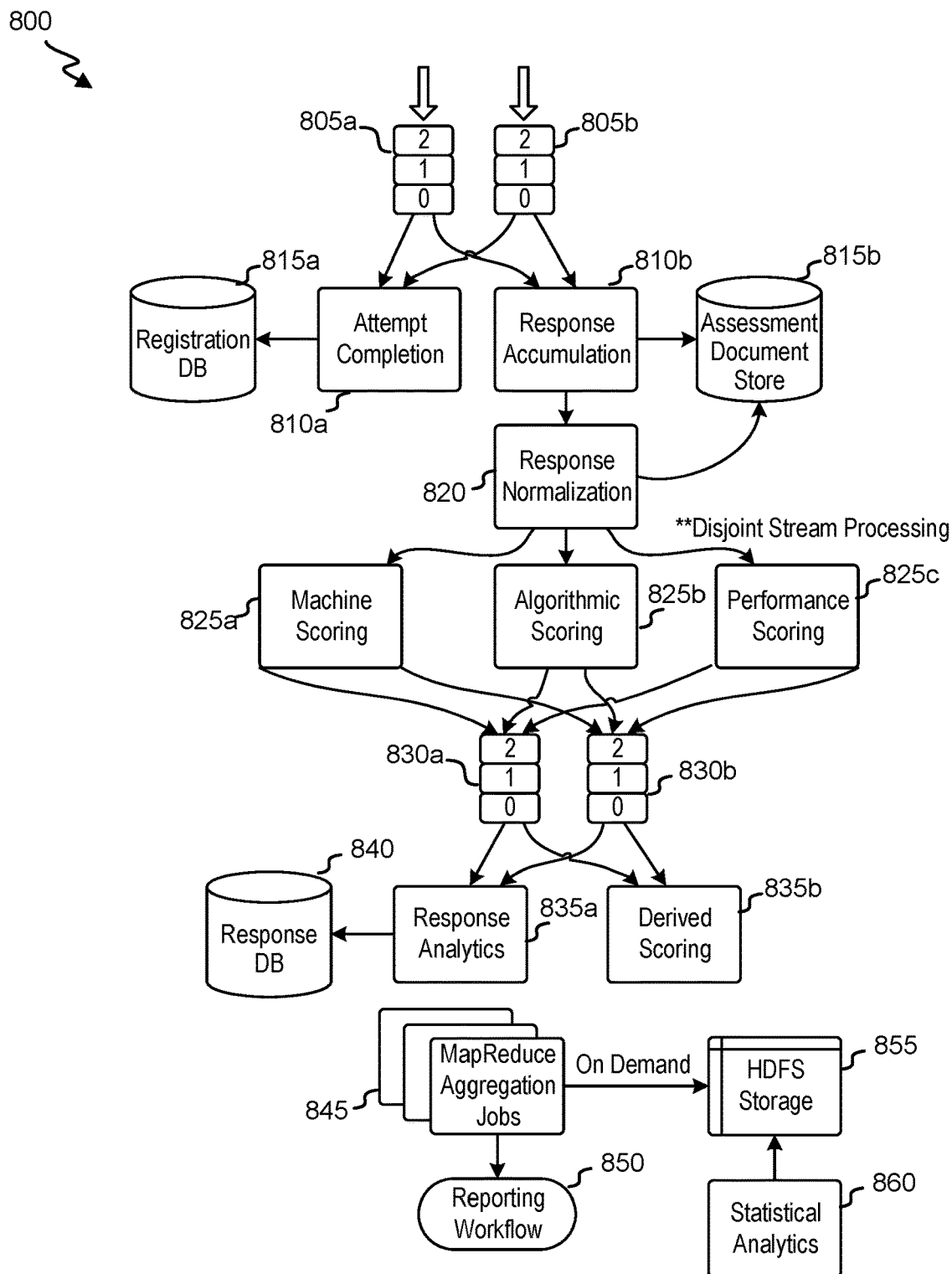
FIG. 8 illustrates an embodiment of a flow diagram of a workflow processing.

Referring next to FIG. 8, a flow diagram 800 of a workflow processing according to an embodiment of the invention is shown. The workflow is structured to provide processing of data sets included in partition streams. In the depicted instance, two initial partition streams 805a and 805b are processed using a same workflow. The two initial partition streams 805a, 805b may include, for example, data sets received via and/or otherwise corresponding to different producer devices and/or characteristics of user devices.

As indicated, each partition stream is ordered. Specifically, each data set included in the partition stream that is to undergo processing is provided with a rank. As new data sets are added to a stream, they are provided with a high or highest rank. A structure of provision of the stream can be such that data sets having a lowest rank are to be processed before other data sets in the stream. In various instances, partition streams 805a and 805b may be processed by a same or by different partitions Blocks 810a, 810b, 820, 825a, 825b, 825c, 835a, 835b, 845, 855 and 860 represent various tasks to be performed in the workflow. Each task may be one being performed by one or more task processors.

In this instance, data sets from each of partition streams 805a and 805b are initially processed, in parallel, at blocks 810a and 810b. For example, Data Set 0 of partition stream 805a may be concurrently processed in accordance with an attempt-completion task at block 810a by a first task processor and also with a response-accumulation task at block 810b by a second task processor. Such parallel process can be advantageous when neither task includes a processing that depends on a result of the other task.

While it will be appreciated that a variety of tasks can be used in accordance with disclosures herein, brief descriptions of the depicted tasks are provided for illustration. In this instance, an attempt completion task identifies information specific to the data set at block 810a. For example, the attempt completion task can identify a user, user identifier, entity identifier, content-object identifier, response(s) identifier(s) and/or time. This information may be included in the data set and/or may be looked up (e.g., in a look-up data structure) using information from the data set. The attempt information can be stored at a registration data store 815a. Registration data store 815a can thus track, for example, whether a same user or user device is a source of multiple responses provided to a same query or content object.

At block 810b, responses are accumulated. The accumulation can include, for example, accumulating multiple responses provided in response to various queries associated with a particular content object and/or provided during a defined time period. The accumulated responses can be stored (e.g., in association with an identifier of a user or user device) at an assessment document data store 815b/

At block 820, each accumulated response set is normalized. Normalization may identify, for example, a weight or normalization factor to be applied to various scores (e.g., overall scores or particular response scores). The weight or normalization factor may be determined, for example, based on scores and/or responses previously identified or received in correspondence (for example) with a same content object, content-object set, entity, time period, user characteristic, etc. The normalization factors and/or weights may also be stored in assessment document data store 815b.

At blocks 825a-825c, at least part of the normalized responses are scored. The scoring can occur in parallel. Because different types of scoring may be associated with different processing times, a given data set may, in some instances, not be concurrently scored via each task. However, parallel configurations can inhibit or prevent scoring of one type to need to wait for scoring of another type to be completed. However, a flexible structure of the system may allow uneven commitment of processors to different scoring tasks to promote similar scoring latencies.

It will also be appreciated that a given response in a data set may be provided with a score using one, more or all of the scoring techniques. For example, particular query types may be associated with particular scoring techniques, so as to not require processing by tasks using other techniques.

Machine scoring, at block 825a, can apply scoring rules to determine whether a correct or target response matches one identified in the data set. Machine scoring may be used, for example, to determine whether an appropriate marking was provided, selection between options were made or word or phrase was entered. Machine scoring may use computer-vision techniques and/or defined scoring rules.

Algorithmic scoring at block 825b, can use artificial intelligence and/or machine learning to score a response. The artificial intelligence and/or machine learning may adapt a scoring rule based on training answers, which may include human-provided scores. Algorithmic scoring may be applied, for example, to provide a score to a text response.

Performance scoring at block 825c, uses other techniques for scoring. In one instance, the scoring facilitates a manual scoring (e.g., by transmitting select portions of a data set to a device for presentation so as to be reviewed and scored by a scoring entity). It will be appreciated that other types of scoring are contemplated.

Results of the scoring are included in new data sets that are then appended to an inter-task stream 830a, 830b. Inter-task streams 830a, 830b can parallel the initial partition streams, in that, if a first data set is in a first initial partition, a processed version thereof can be included in a first inter-t ask partition. Further, an order of the results can be the same as an order of the corresponding data sets.

Each of inter-task streams 830a and 830b can be processed, in parallel in accordance with a response-analytics task at block 835a and a derived scoring task at block 835b.

Response analytics at block 835a can include performing various types of analytical or statistical techniques to responses and/or scores associated with (for example) a given content object. For example, correlation analysis and/or cluster analysis may be used to determine that responses (e.g., from a particular user device) of a given type were generally associated with low scores. Analytics can be stored (e.g., in association with one or more identifiers, such as an identifier of a user device, user, entity, date, content object, etc.) in a response data store 840.

Derived scoring at block 835*b* can include, for example, applying any scoring weights and/or normalizations and/or aggregation response-specific scores into one or more overall scores. Derived scoring may be performed so as to apply one or more normalization factors that will promote achieving a target statistic or distribution across a set of scores.

Thus, various task processing can cause a variety of data to be stored in various data stores, which collectively can form a distributed data store, such as HDFS storage 855. A storage management technique can track which data is present and where it is stored. Thus, at block 845, a MapReduce aggregation job can facilitate retrieving a specific collection of data. For example, the collection may include a set of response analytics, each of which is associated with a given time period, entity and user characteristic. Such retrieval may be performed, for example, in response to receiving a request Statistical analytics performed based on data derived from multiple data sets can be performed at block 860 to identify, for example, means, medians, modes, variances, correlations, and/or distributions of a group of data sets (and/or of each of multiple groups of data sets).

Further, by monitoring which data is being stored and where, MapReduce aggregation jobs 845 can identify a current progress in a processing job, which can be identified to a client via a reporting workflow 850. For example, a communication can be transmitted to a client device that identifies a fraction of data sets that have been processed, latencies of various task completions, and so on. In various instances, statistical analytics task 860 may further report statistical analytics to a client device.

Figure 9:
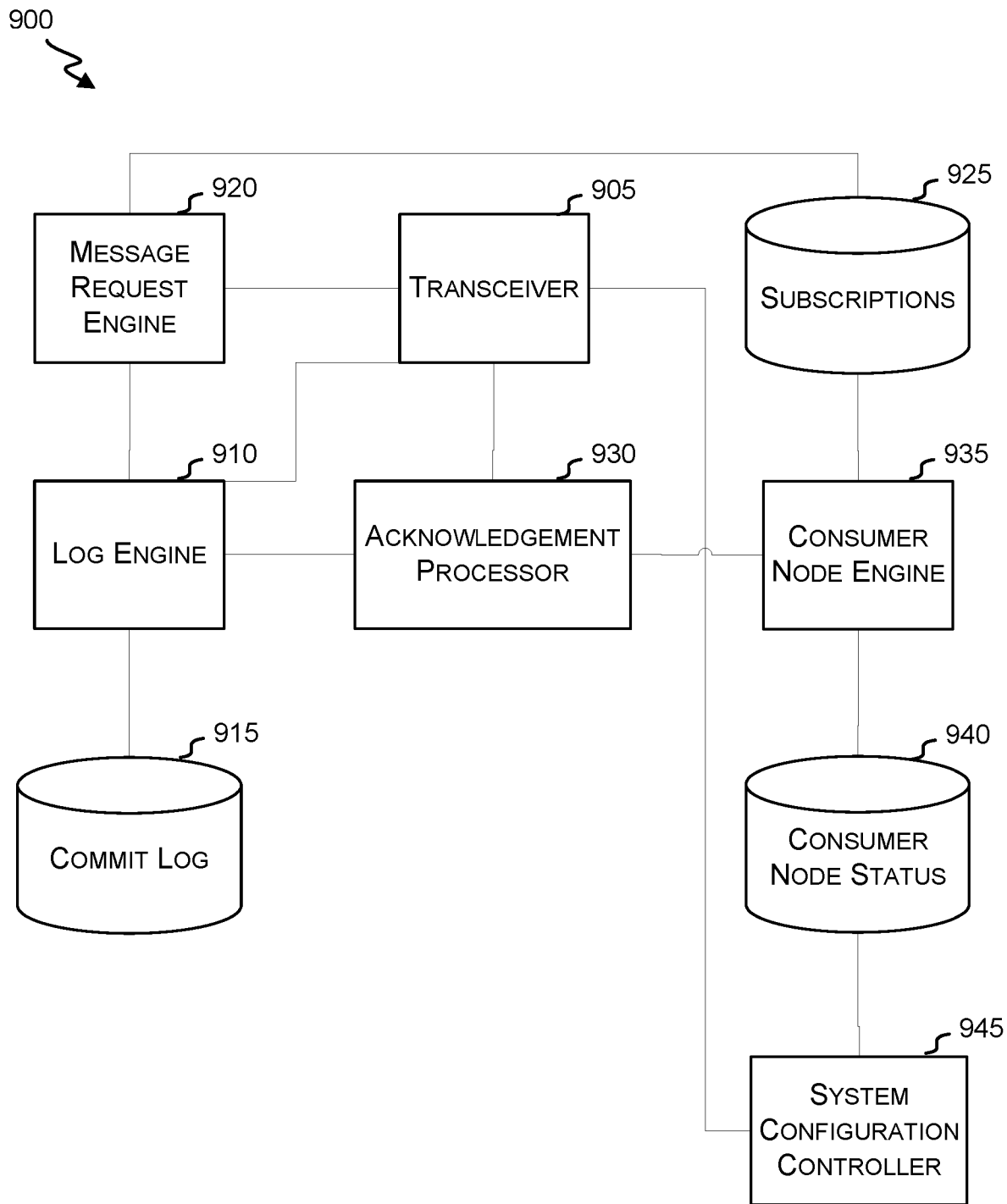
FIG. 9 depicts an embodiment of a block diagram of a stream management system.

Referring next to FIG. 9, a block diagram of a stream management system 900 is shown. Stream management system 900 may be, for example, a part of message allocator 622 and/or partition controller 624.

Stream management system 900 can include a transceiver that (e.g., wirelessly) receives and transmits communications to one or more other devices. In one instance, a received communication can include a producer-device communication from a producer device that includes one or more data sets for processing. In one instance, a received communication can include a communication or stream from a message allocator (e.g., received at a partition controller) that includes one or more data sets for processing.

A log engine 910 can update a commit log 915 to reflect that the data set(s) from the communication or stream are pending for processing. The update can include, for example, assigning each of the data set(s) a rank, which may be a rank higher than any other (e.g., incremented by one) in commit log 915. In some instances, the rank is communicated to one or more other devices via the transceiver, which may provide the other device(s) with an indication that data is available for processing and may be provided, for example, in response to a request.

Transceiver 905 may also receive a message request communication from a consumer node. For example, a message request communication may be received at a partition controller from a task processor and/or a message request communication may be received at a message allocator from a partition controller. Such a request communication may indicate, for example, that the requesting device is ready to process or assign for processing another data set.

A message request engine 920 may analyze the message request communication to determine whether and/or what data is to be provided in a response. Message request engine 920 may determine whether a requesting device is authorized to receive any messages and/or which data sets a requesting device is assigned to handle by looking up a device identifier in a subscriptions data store 925. Subscriptions data store 925 may reflect, for example, tags and/or characteristics controlling partition-based routing of data sets and/or tasks, tags and/or characteristics controlling processor-based routing of data sets.

If a requesting device is authorized to receive a data set, message request engine 920 may identify a stream or queue that the device is subscribed to (e.g., an initial partition stream or an inter-task partition stream) and may request a low-order data set from log engine 910. Log engine 910 may identify a data set having a lowest rank amongst those in the identified stream that have not yet been distributed for processing. The data set may then be provided in response to the request (e.g., via message request engine 920 and transceiver 905), and log engine 910 can update commit log 915 to reflect an assigned status.

An acknowledgement processor 930 can monitor incoming communications for subsequent communications from the device to which the data set was provided and/or from a storage management device. Acknowledgement processor 930 can be configured to detect communications that explicitly or implicitly indicate that a particular processing of the provided data set has been completed. For example, a new message request communication from the device may indicate that processing (e.g., of a particular type) of a previous data set has been completed. As another example, a communication from a storage management device may indicate that a result associated with the data set has been stored, which may indicate that processing (e.g., of a particular type) has been completed. As yet another example, a communication from the assigned device may explicitly indicate that processing (e.g., of a particular type) was completed.

Upon such detection, log engine 910 may update commit log 915 to remove the data set from the log. Such removal may cause ranks of each other data set in the log to drop (e.g., by 1). If no such detection is received after a defined time period expires, log engine 910 may provide a cancelation communication to an assigned node and may subsequently provide the data set to another consumer node for processing.

A consumer node engine 935 can monitor performances of various consumer nodes based on various detections by acknowledgement processor 930. For example, consumer node engine 935 may identify (e.g., repeatedly and/or continuously) a processing latency and/or quantity of requests associated with a given node. Consumer node engine 935 may further or alternatively detect when a consumer node is not responsive and/or does not respond with an indication that a processing has been completed within a defined time period. Monitored node-specific data can be stored in a consumer node status data store 940.

A system configuration controller 945 can use the monitored data to determine whether a configuration of a network, partition and/or set of task processors 945 is to be changed. For example, non-responsiveness of a node may trigger system configuration controller 945 to facilitate replacing the node with another. Long latencies may cause system configuration controller 945 to add additional task processors to a partition, to add an additional partition to a network and/or to reassign partial or full task assignments from long-latency processors to other processors. System configuration controller 945 may include, for example, a virtual system configurer 636. Changes to system configurations may be based on non-performance factors as well or alternatively, such as changes to volume of incoming data sets for processing, changes to a workflow, etc.

It will be appreciated that, while the description of commit log 915 and message request engine 920 indicates that data sets are provided to consumer nodes in response to requests, data sets may alternatively be intermittently or continuously pushed to one or more consumer nodes.

Figure 10:
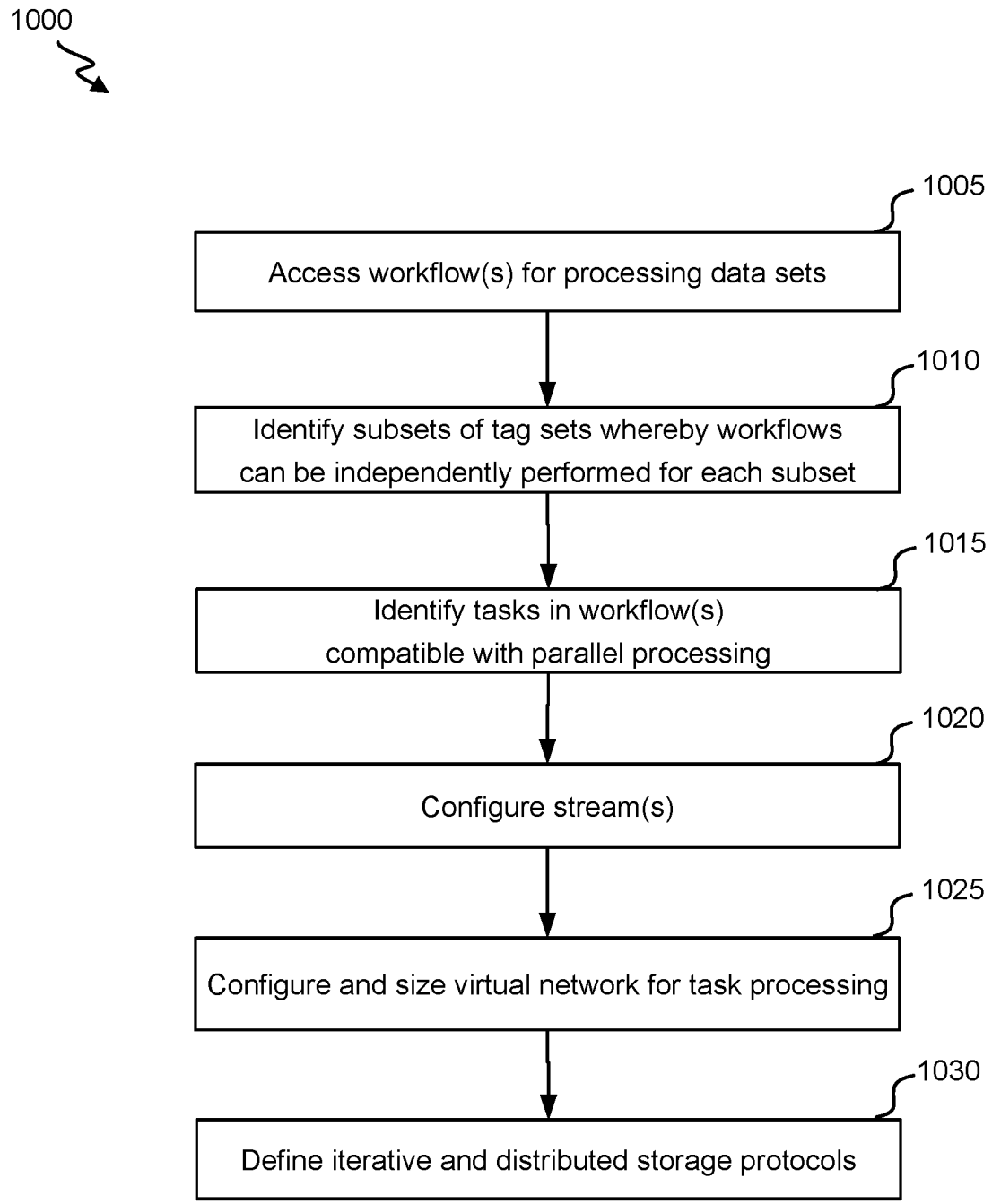
FIG. 10 illustrates a flowchart of an embodiment of a process for configuring a data processing network for generating and processing partitioned streams.

FIG. 10 illustrates a flowchart of an embodiment of a process 1000 for configuring a data processing network for generating and processing partitioned streams. Part or all of process 1000 can be performed by system configuration controller 945 and/or virtual system configurer 636. Process 1000 begins at block 1005 where one or more workflows for processing data sets are accessed. Workflows may include a set of tasks for processing one or more data sets. In some instances, one or more first tasks are configured to process individual data sets and/or responses provided by a particular user device or user. In some instances, one or more second tasks (which may be performed after the first task(s) or instead of the first task(s)) are configured to process population data, such as concurrently processing multiple data sets or responses from different user devices or producer devices (e.g., to generate one or more result variables that depends on each of the multiple data sets or responses); or concurrently processing multiple results that correspond to different data sets or user devices.

Workflows can be defined, for example, based on input, machine learning, rules and/or processing specifications associated with particular content objects. To illustrate, a workflow can include a tasks to verify that a user device is associated with an authorization to submit responses to particular queries; verify a completeness or other status of a data set; execute a computer-vision technique to generate a score for each response; and generate a score for a collection of responses. These tasks can be initially defined and ordered based on a rule generated based on input from a client. Meanwhile, the computer-vision technique may be dynamic and adaptive, such that it is repeatedly updated based on machine learning.

A workflow may be universally applicable and/or dependent on one or more variables. For example, different workflows may be used to process data sets received from different producer devices, producer devices from different locations, data sets received during different time periods, data sets associated with different content-object identifiers, etc.

In some instances, a single workflow independently specifies how data sets are to be processed. In some instances, multiple workflows can be effected in combination. A workflow hierarchy may be established, such that (for example) one or more first types of workflows (e.g., defined by a client to be applied to processing data sets from a set of producer devices) may specify which types of tasks are to be performed (e.g., and one or more specific tasks) and one or more second types of workflows (e.g., specific to a type of content object or type of content object) may specify particular tasks corresponding to task types. To illustrate, a first client workflow may identify that a workflow is to include: an authorization analysis task; a response aggregation and completion task; a per-user score task; and a population-score-analytic task; and a second workflow may identify—for each of a set of content objects—how responses in data sets are to be scored in the per-user score task.

A workflow, or specifications of particular tasks in the workflow, may be configured such that it is to be used to define processing of particular types of data sets. The particular types of data sets can include those that are associated with particular tags or characteristics, such as an identifier of a user device, user, producer device, entity, content object and/or time.

At block 1010, a plurality of subsets of tag sets are identified. The subsets are identified such that iterations of the accessed workflow(s) can be independently performed for each subset.

For example, a workflow may include a task that depends on data from multiple data sets. Thus, if the data sets were initially processed independently, the task could not be completed until each independent initial processing were completed. Meanwhile, if a workflow did not include a task that relied on data from particular multiple data sets, the data sets could be processed independently via the workflow.

Accordingly, block 1010 can include identifying which variable dependencies are introduced via high-level analyses in workflows and detecting which types of data sets do not share influence to a single task result in a workflow. Because workflows may define which variables are to be analyzed in aggregate via tags, block 1010 can include an identification of tag identifiers.

For example, each communication from a producer device may include a tag that identifies (to illustrate): a content object, user characteristic, producer device, institution or entity, district, time, etc. Thus, a tag set may include each of: a set of content objects, a set of user characteristics (e.g., grade levels), a set of producer devices, a set of institutions or entities, a set of districts, a set of times, etc. A workflow may indicate that at least some variables are to be generated based on multiple data sets and that real-time population variables are to be generated, with each being based on data sets corresponding to a single value of a particular user characteristic. Accordingly, data sets that correspond to different values of the particular user characteristic may be processed independently, such that each value of the particular user characteristic may define a subset of the tag set for the user characteristics.

At block 1015, two or more tasks in the workflow(s) that are compatible with parallel processing are identified. The identification can be made based on determining which tasks rely on results from other tasks. In some instances, a first task and a second task may be identified as being compatible with parallel processing when: the first task does not use a result of the second task and the second task does not use a result of the first task. For example, in FIG. 8, tasks 810a and 810b may be identified as being compatible with parallel processing, as may blocks 825a, 825b and 825c; blocks 835a and 835b; 820 and 810a; etc.

In some instances, if task nodes in a workflow are defined such that "parent" task nodes are those that generate results used by an instant task and "child" task nodes are those that use results of the instant task, first and second tasks may be identified in block 1015 when neither the first task nor any child (or grandchild, etc.) of the first task uses a result of the second task and the converse. For example, in FIG. 8, task 810a may be identified as being compatible with parallel processing with block 810b or any child task thereof.

At block 1020, one or more streams are configured. The streams may include initial partition streams and/or inter-task streams. Each initial partition stream may correspond to a different subset of tag sets and/or characteristics, such that data sets being processed via the stream and in accordance with a corresponding workflow may be fully processed in accordance with the workflow without requiring data from another initial partition stream. In some instances, different initial partition streams are processed in accordance with different workflows. In some instances, different initial partition streams are processed in accordance with a same workflow.

Configuring initial partition streams may include identifying which data from incoming communications (e.g., producer-device communications) to include in the stream and/or how to aggregate or separate such data. A stream may include multiple data sets or elements, and thus, part of block 1020 may include determining what type of data and a quantity of data to be included in each element. For example, an element may be defined to include various identifiers and a single response; or various identifiers and all responses pertaining to a single user device and content object. Element definitions may be determined based on workflow rules and/or workflow configurations (e.g., which may be fixed, client-defined, determined based at least in part on machine learning, etc.).

Inter-task streams may be defined to pass results between sequential tasks. Configuration of inter-task streams may be based on analyzing which data is used by other child task nodes in the workflow. In some instances, elements in inter-task streams are defined so as to correspond to elements in initial partition streams, such that—for example—results included in an element in an inter-task stream are based on data in a corresponding element in an initial partition stream. These corresponding elements may be associated with a same rank or identifier.

Configuring the one or more streams may include initializing a log to track a consumption of a stream and elements' ranks. For example, when data is added to a stream, it may be assigned a highest rank for the stream. A log may associate the rank with an identifier of the data. As elements in the stream are processed, each element's rank may decrease (e.g., by 1), and the log may be updated accordingly. The log may further track times, such as when an element was added to the log, when it was assigned for task processing and/or when such processing was completed (e.g., as defined as being a time at which a request for data for a next element was received). In some instances, a single log tracks element data for multiple (or all) streams involved in a workflow implementation or a partition. In some instances, different logs are established for different streams.

At block 1025, a virtual network (or other data processing network) is configured for task processing. The configuration may include, for example, identifying a number and/or type (e.g., configuration, hardware specification, software accessibility, etc.) of processors to devote to processing for each task (or sets of tasks). In instances where multiple processors are assigned to a task, a technique may be defined to indicate how a particular processor is to be selected for processing a particular task iteration (e.g., a round-robin technique).

Each processor may have or may be assigned (e.g., as part of the configuration) an address. Thus, a task management engine may use these addresses to monitor task processing and to assign new task iterations to particular processors. An address for the task management engine may be further established (or a task-specific identifier may be sent to each task-associated processor), such that other devices can send task-input results or data sets and/or can request task-output results. The configuration may include sending communications to various processors that identify source and/or destination addresses that correspond to other task processors or task-specific identifiers). These communications may include, for example, a processing instruction that indicates that data is to be requested from a particular address and/or that data is to be transmitted to a particular address.

At block 1030, one or more iterative and distributed storage protocols are defined. Using different processors to process different tasks would support a network structure where one or more processors may store intermediate results prior to a generation of one or more final results. For example, in a workflow, various results may include: an authorization analysis; a completion analysis; a per-response score; a cumulative score; and a normalized score. For a given data set, these results may be generated in accordance with a sequence. If the results were not stored as they were generated, there would be a risk of losing results if a system failure or problem occurred. If storing these results were part of a linear workflow, task processing would be delayed due to storage efforts.

A storage protocol can indicate that each of multiple task processors are to store intermediate results (or select intermediate results). In some instances, the results are stored locally at a performing task processing, which can establish a distributed storage system. In some instances, at least some results are stored remotely (e.g., at a central storage device or system, which may include a virtual device or system). Results may be stored, for example, as they are obtained, at defined time periods or times, when a defined number (or data size) of results are obtained, etc. Results may be stored in association with an identifier of an element or other identifier described herein.

Figure 11:
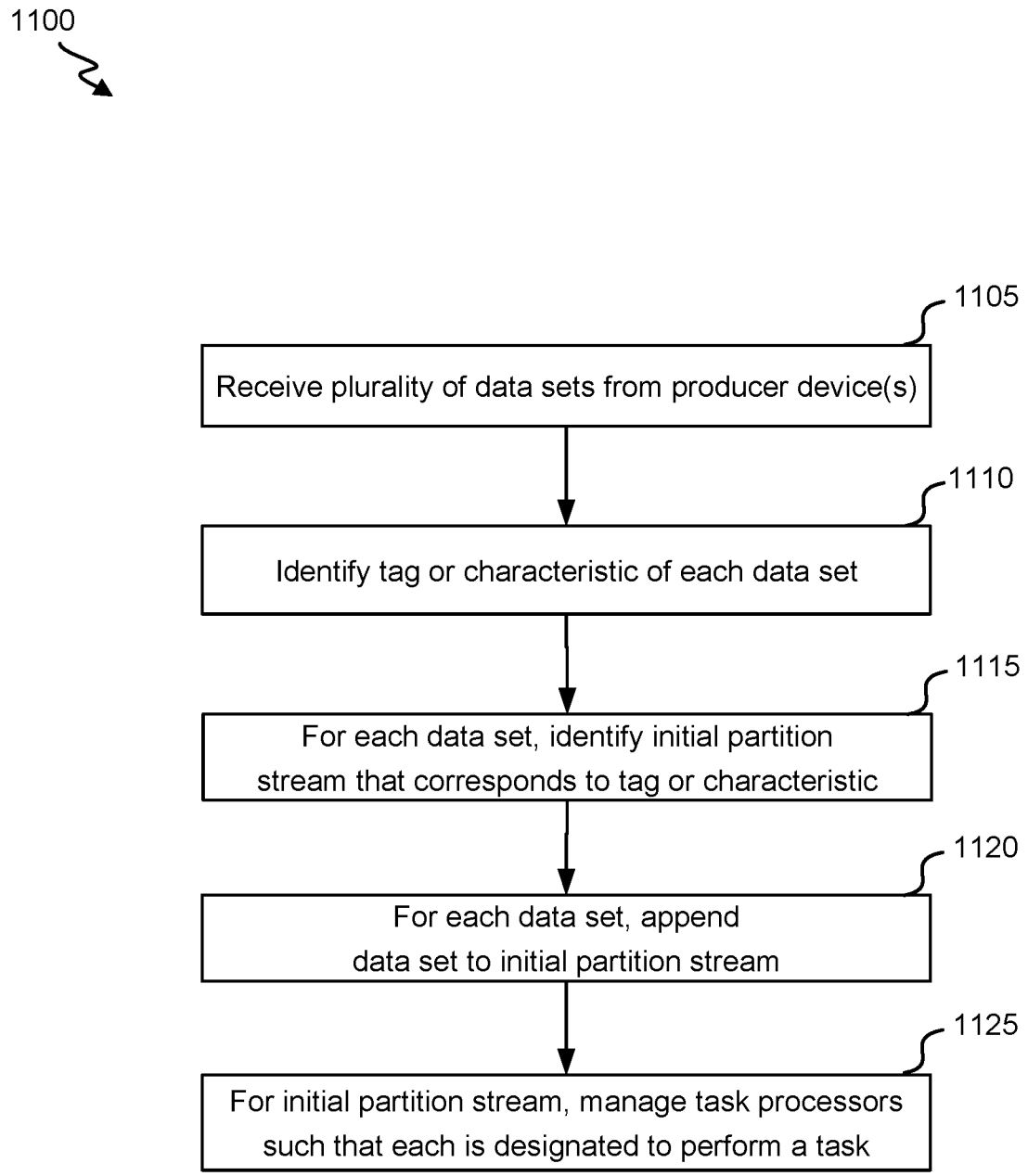
FIG. 11 illustrates a flowchart of an embodiment of a process for generating partition streams.

FIG. 11 illustrates a flowchart of an embodiment of a process 1100 for generating partition streams. Part or all of process 1100 can be implemented in message allocator 622. Process 1100 begins at block 1105 where a plurality of data sets are received, at one or more times, from one or more producer devices. Each data set in the plurality of data sets may include one or more responses. In one instance, each response is responsive to query content identified in a content object (e.g., an electronic test of exam, such as a standardized test, such as the SAT, NAEP or ITBS) that may have been presented at a user device where the response was identified. Each data set in the plurality of data sets may include or otherwise be associated with one or more tags or characteristics.

At block 1110, a tag or characteristic of each of the one or more data sets is identified. The tag or characteristic may be determined, for example, based on content in the data set, content in a communication that had included the data set, metadata, a current time, and so on.

At block 1115, an initial partition stream is identified for each of the one or more data sets that corresponds to the tag or characteristic. The stream can be identified in accordance with a configuration, such as one identified at block 1020 of process 1000, that associated a tag or characteristic with an initial partition stream. In some instances, the initial partition stream may also be based on (for example) load balancing, stream-specific processing characteristics (e.g., processing latencies and/or storage usage), priorities of the data sets, and so on.

At block 1120, for each of the one or more data sets, the data set is appended to the identified initial partition stream. The appending can include assigning a rank (or order) to the data set. The rank can be determined, for example, by adding a prescribed amount (e.g., "1") to a highest rank in the identified stream. In this case, data would be processed in a stream in an order that corresponds to that at which it was received. In some instances, the rank depends on a priority of data sets (e.g., such that high-priority data sets are provided with low-number ranks, such that each high-priority data set in a stream is to have been assigned for processing prior to a lower priority data set being assigned for processing).

At block 1125, for each initial partition stream, a set of task processors are managed such that each is designated to perform a task. Tasks can include those defined by a workflow, which can include processing of received data sets or processed versions thereof. The processing can include processing elements in an initial partition stream or processing elements in one or more inter-task streams that can include results from other task performances. Tasks can further include storing a result (e.g., at a storage local to the task processor) of the processing.

Managing the task processors can include identifying which, how many and/or what type of task processors are to perform each of one or more task types. In instances where multiple task processors are designated for a single task, managing the task processors can include establishing a protocol to use to select from amongst the multiple task processors for a particular processing, such as load-balancing, fair selection, weighted fair selection, class-based selection or other reverse-based scheduling protocols (e.g., so as to select which processors will process data as opposed to selecting which data will be processed by a processor).

Managing the task processors can include adding or removing one or more task processors from a set of task processors, which can include requesting that a virtual machine or virtual server be added or removed from a virtual system. Managing the task processors can include generating and transmitting an instruction to one or more processors that identifies a source device from which data will be provided; task processing to be performed; which processing results are to be stored (e.g., and where) and/or a destination device to which processing results are to be provided. In some instances, managing the task processors includes configuring a new inter-task stream or modifying a configuration of an existing inter-task stream. For example, if initially a set of tasks were to be performed by individual processors, and the tasks were later divided across processors, an inter-task stream that includes pertinent results may be established between the processors.

Managing the task processors may include a repeated performance analysis. For example, a processing latency or per-processor statistic (e.g., average processor or memory usage) could be monitored to detect an above-threshold value or above-threshold derivative value (or below-threshold value or below-threshold derivative value). The threshold comparison can influence whether new servers (or other processors) are recruited to or released from a system.

Figure 12:
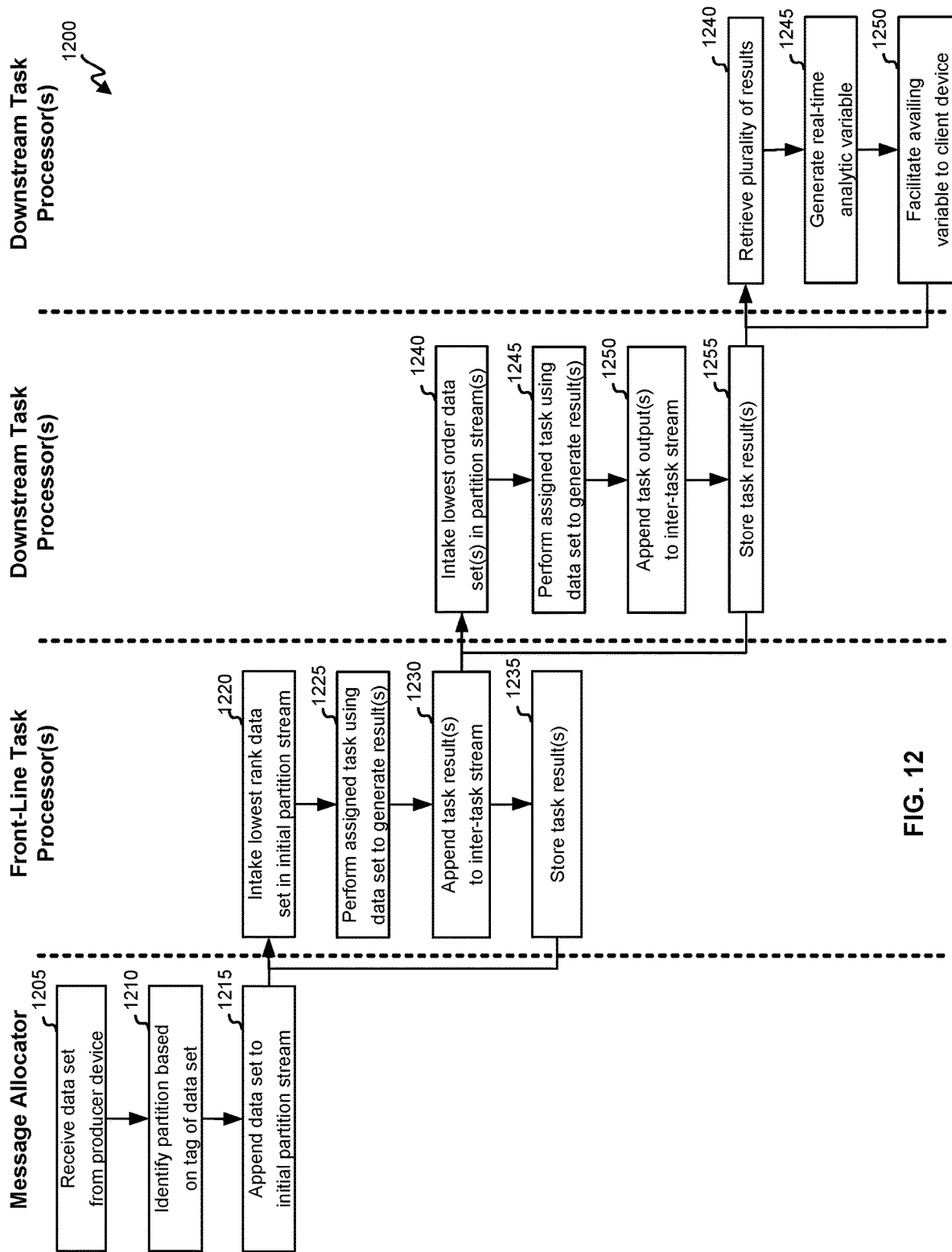
FIG. 12 illustrates a flow diagram of an embodiment of a process for processing data sets using partition streams.

FIG. 12 illustrates a flow diagram of an embodiment of a process 1200 for processing data sets using partition streams. Process 1200 begins at block 1205 where a message allocator receives a data set from a producer device. The data set may include one or more responses (e.g., to one or more queries in a content object) and one or more identifiers (e.g., of a user, user device, content object, institution and/or district) and/or time. The data set can include one included in a communication, which may include multiple data sets.

At block 1210, a partition is identified for the data set. Block 1210 of process 1200 can correspond to block to the identification performed at block 1115 of process 1100. At block 1215, the data set is appended to a partition stream for the identified partition. For example, an element in the partition stream may be generated, assigned a rank and/or identifier and associated with an identifier of the data set. The rank may include one higher than other ranks in the partition stream or one identified based on another reverse-based scheduling technique described herein.

The partition stream can include one transmitted or streamed to a task processor. The stream may be continuously or intermittently transmitted to the task processor. For the last instance, data sets associated with elements in the stream may be transmitted to the task processor in a push or pull manner. For example, a task processor may send a request for a next data set to process when the task processor is available for processing (e.g., after completing processing of a previously assigned data set).

At block 1220, a lowest rank data set is received at one or more front-line task processors (e.g., associated with a particular workflow associated with a data set) as intake via an initial partition stream. The front-line task processor(s) can include those designated to perform one or more first tasks in a workflow. The data set may be one that is received via a push or push protocol. The lowest rank data can include one in the partition stream or a part of the partition stream associated with a particular identifier that is of a lowest rank (e.g., a highest processing priority).

At block 1225, an assigned task is performed using the data set to generate one or more results. The assigned task can include tasks in a workflow that are assigned to the front-line task processor(s). Exemplary tasks can include (for illustration) verifying authorization, estimating a completion (e.g., in terms of a portion of queries for which responses were provided), identifying a provided response, etc. A result of a performed task can include a binary, category-response, discretized, numerical, etc. type of response. Performing the task may include, for example, applying a machine-vision, machine-learning, or rule-based processing. Performing the task may generate one or more responses, which may include (for example) a binary response, category response, numeric response, continuous-gradient response, etc. For example, performing the task may include determining whether and/or an extent to which one or more responses, results or intermediate results match one or more target responses, results or intermediate results.

At block 1230, one or more task results are appended to an inter-task stream. Appending the one or more task results can include assigning one or more ranks to one or more elements in the inter-task streams to be associated with the one or more task results. The one or more ranks can include ones that are the highest (e.g., incremented by one) incremented by one in the inter-task stream. The one or more task results can include those that are utilized by one or more task processors that receive the stream. If multiple task processors receive the inter-task stream—in various instance—a single or multiple inter-task streams may be established (e.g., for processing by each downstream task processor).

At block 1235, one or more task results are stored. The task result(s) may be stored locally at the front-line task processors. In some instances, the task result(s) can include those needed to perform subsequent tasks in a workflow and/or those to assess response quality. The one or more task results may be stored locally at the one or more front-line task processors or at a destination storage location (e.g., a defined storage location or one identified based on a storage protocol).

Elements in the inter-task stream may be received at one or more downstream task processors at block 1240. Task performance, inter-task stream appending and task-result storage performed at blocks 1245, 12450 and 1255 can correspond to actions performed at blocks 1225, 1230 and 1230.

In various instances, statistical analytics (e.g., generally determined or determined for a particular user group, client, geographic region, institution, etc.) may be generated in real-time (e.g., at defined times or time intervals or in response to receiving a threshold number of data sets meeting a defined criteria) and/or may be generated post-hoc.

At block 1240, a plurality of results are retrieved. The results may be retrieved from a localized or distributed data store. In some instances, each of the plurality of the results correspond to a single tag or characteristic. In one instance, each of two or more of the plurality of results (or each of the plurality of results) are stored at a different device and/or physically separated system. For example, task processors may locally store task results generated as part of processing data in accordance with an assigned tasks. Thus, results that relate to data from different tasks and/or different data sets (e.g., if multiple task processors are assigned to handle a same task) may be stored at different task processors.

At block 1245, a real-time analytic variable is generated based on the retrieved results. The real-time analytic variable can include (for example) a mean, median, mode, variance, standard deviation, range, modality, distribution, characteristic, etc. The real-time analytic variable can include on that is generated (for example) for all results associated with one or more tags or characteristics for a particular recent time period or existing.

At block 1250, availing of the generated real-time analytic variable to a client device is facilitated. For example, the real-time analytic variable may be periodically transmitted to the client device (e.g., via email, text message, etc.) or provided via a webpage or app page. In some instances, the facilitation can include availing the real-time analytic variable to the client device when a particular condition is met (e.g., when a variable is below a threshold). The availing can include identifying one or more other identifiers associated with the real-time analytic variable (e.g., an identifier of a tag or characteristic).

Accordingly, process 1200 exemplifies how initial partition streams and inter-task streams can be used to transmit pertinent data between processors such that appropriate processing can be performed in a distributed manner.

Figure 13:
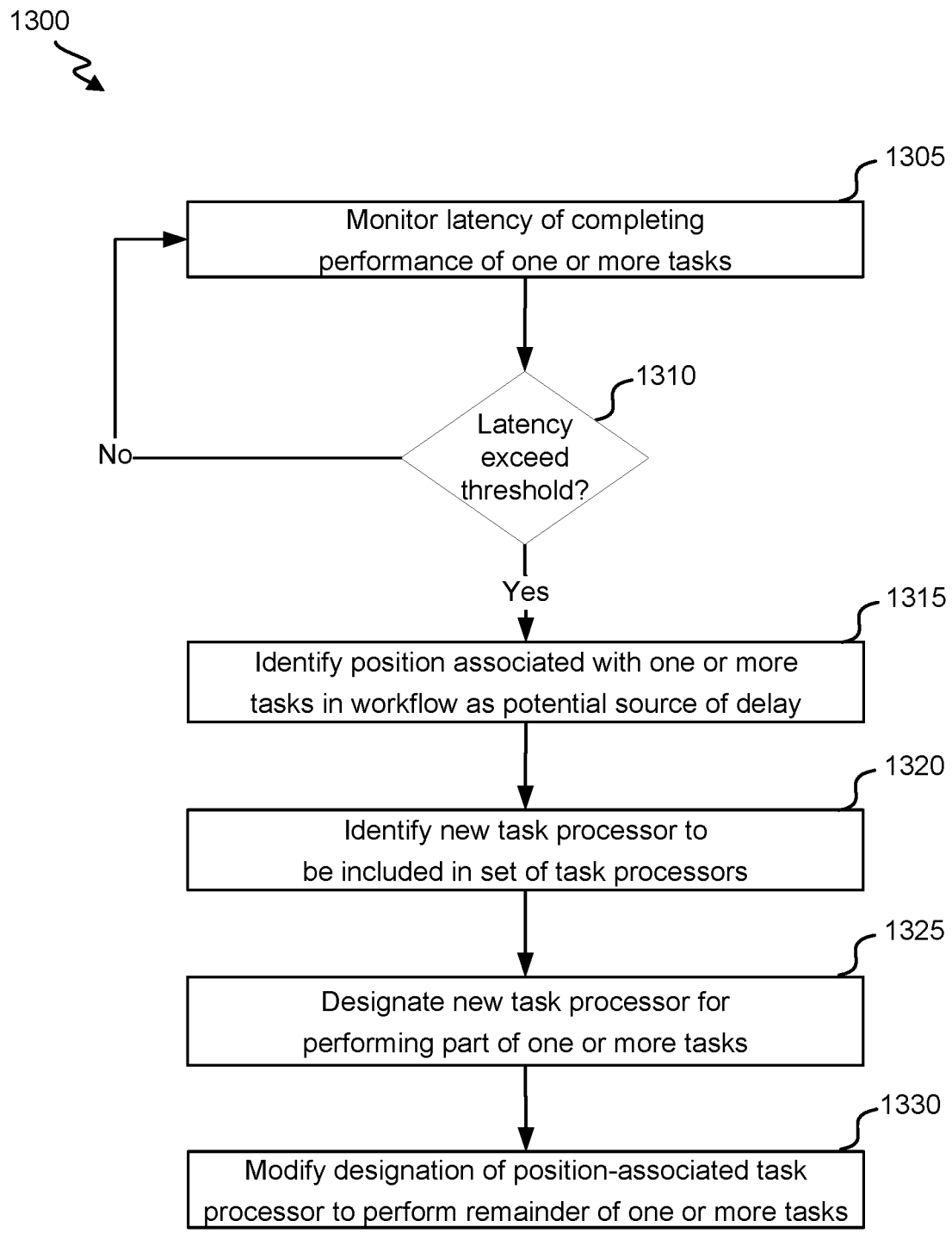
FIG. 13 illustrates a flowchart of an embodiment of a process for reconfiguring a data processing network in response task performance monitoring.

FIG. 13 illustrates a flowchart of an embodiment of a process 1300 for reconfiguring a data processing network in response task performance monitoring. Part or all of process 1300 can be performed by system configuration controller 945 and/or virtual system configurer 636. Process 1300 begins at block 1305 where a latency of completing performance of one or more tasks is monitored. For example, a latency can be defined as a time between a first time at which an element associated with a data set is added to a stream and a second time at which processing of the data set is completed (e.g., as identified based on a communication identifying a task progress or completion; a communication requesting new data to process; and/or detection that a new result is stored). The latency can be identified as a statistic of one or more time delays (e.g., a mean, median, mode, maximum or minimum).

At block 1310, it is determined whether the latency exceeds a threshold. The threshold may include a fixed threshold; a threshold specific to a client, content object, institution, or other identifier; an absolute threshold; and/or a relative threshold (e.g., relative to a previous latency statistic, a latency statistic associated with one or more other identifiers, etc.).

If it is determined that the latency does not exceed the threshold, process 1300 returns to block 1305. If it is determined that the latency does exceed the threshold, process 1300 continues to block 1315, where a position associated with one or more tasks in a workflow is identified as being a potential source of delay. In one instance, a latency for each task is monitored, and the position is identified as being one associated with a task with a longest latency or one associated with an above-threshold latency. In one instance, the position is identified as one associated with infrequent requests for new data to process (e.g., relative to requests from task processors assigned to complete other tasks). In one instance, the position is identified as one that is configured to receive an inter-task stream, and the inter-task stream is long (e.g., compared to other inter-task streams, so as to indicate that a relatively large number of data elements are awaiting processing).

At block 1320, a new task processor is identified to be included in a set of task processors designated to perform the one or more tasks. The identification may include identifying a task processor that had been designated to perform another task or had been designated to process data from another workflow. The identification may include identifying a task processor that had not previously been included (or that had not previously been active) in a data processing network. The new task processor can include one configured to be able to perform at least one (or each) task in the one or more tasks. The new task processor can include one that is coupled with (e.g., in a same housing and/or co-located) or that can communicate with a storage with sufficient space so as to be predicted to be able to store results from the at least one (or each) task in the one or more tasks.

At block 1325, the new processor is designated for performing part of the one or more tasks. The designation can include, for example, sending processing and/or storage instructions to the new processor and/or other processors (e.g., such that the other processors can identify which processors are to provide data for processing and/or are to be provided with data to be processed).

In some instances, at block 1330, a designation of the position-associated task processor is modified to perform a remainder of the one or more tasks. As one example, a task-associated processor may have been assigned to perform processing for multiple tasks, and block 1325 includes include designating one or more new task processors with an incomplete subset of the multiple tasks, and block 1330 includes modifying a designation of the task-associated processor so as to perform processing for a different incomplete subset (e.g., that does not overlap with the incomplete subset) of the multiple tasks. As another example, block 1325 includes designating the new task processor to perform the same task(s) as the position-associated task(s) but for a particular type of data sets.

Figure 14:
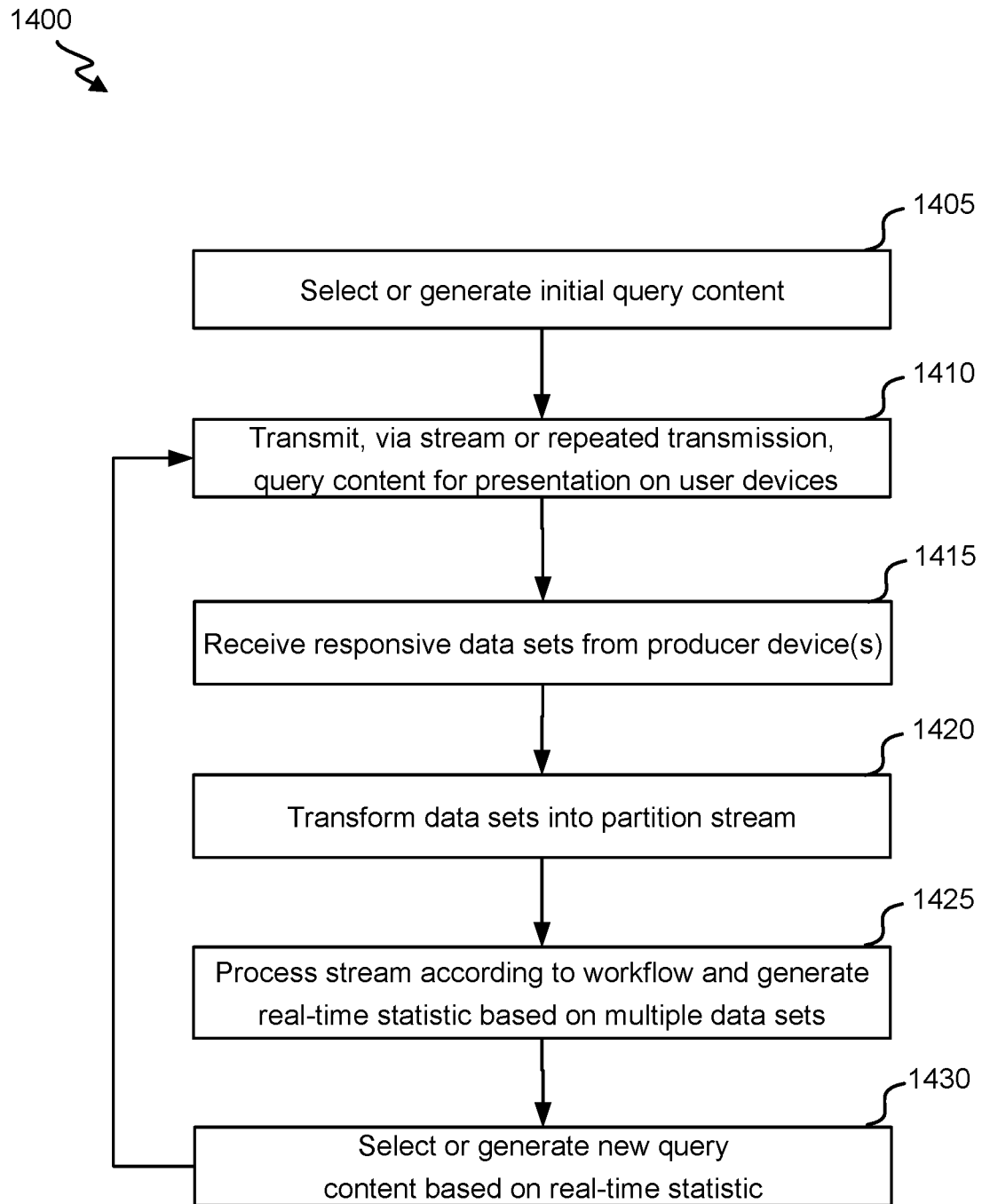
FIG. 14 illustrates a flowchart of an embodiment of a process for adapting query content in response to population real-time partition-based scoring of data sets.

FIG. 14 illustrates a flowchart of an embodiment of a process 1400 for adapting query content in response to population real-time partition-based scoring of data sets. Part or all of process 1400 can be implemented in a content distribution network 100 and/or data processing network 600. Process 1400 begins at block 1405 where initial query content is selected or generated. For example, an electronic content object can include multiple electronic queries, that are structured to facilitate the queries being presented (e.g., concurrently or sequentially) at a user device. The user device may then generate a response that corresponds to input received at the device.

At block 1410, the initial query content is transmitted for presentation on one or more user devices via a stream or repeated transmission. In one instance, the initial query content may be transmitted at a defined time or in response to a request. The initial query content can be transmitted via a content distribution network (e.g., content distribution network 100). The initial query content may be transmitted, for example, via a network, directly to a user device or via an intermediate device (e.g., a supervisor device).

At block 1415, a plurality of data sets responsive to the query content is received. The plurality of data sets may include responses transmitted from a plurality of user devices (e.g., via the plurality of producer devices) to one or more same queries or different queries. The plurality of data sets can be received at a single time and/or at multiple times. The plurality of data sets can be received from a single producer device or from multiple producer devices.

At block 1420, the data sets are transformed so as to be part of a partition stream. The transformation can include, for example, applying a schema; modifying a formatting; aggregating response data with additional data (e.g., based on an identifier of a producer device). The transformation can also include generating or identifying an identifier of an element in the stream. The identifier may then be associated with other information, such as a time, producer-device identifier, etc.

At block 1425, the parts of the partition stream corresponding to the data sets are processed according to an applicable workflow. The processing can be performed by one or more task processors and can include a synchronized or asynchronized analysis of the data sets. The processing can produce a score for each data set, that may include a score for an individual response and/or query or a score for a particular set of responses and/or queries (e.g., that correspond to a particular user device; content object and/or subject). For example, a score can identify a portion of analyzed responses that correspond to those identified in a key. The processing can further include generating a real-time statistic based on multiple data sets. The real-time statistic can include, for example, a mean, median, mode, percentage of scores above a threshold, percentage of scores below a threshold, range, standard deviation, variance, etc. based on scores associated with multiple user devices or a statistic (e.g., a percentage matching target responses) generated based on an aggregation of responses across the multiple data sets.

The real-time generation of the statistic can include, for example, a generation that is based on data sets received or processed within a defined recent time period (e.g., a current day, last hour, last month, etc.) and/or data sets received or processed since a defined time (e.g., 8 am on a current day).

At block 1430, new query content is generated based on the real-time statistic. In one instance, a target statistic and/or distribution characteristic is identified. The real-time statistic generated in block 1425 can be compared to and/or assessed in view of the target statistic and/or distribution characteristic. An average or variability of a difficulty level of queries may then be adjusted to promote achieving the target statistic and/or distribution characteristic. Thus, queries provided in a content-object stream or repeated transmissions may adapt based on population-level responses. Such adaptation may be in lieu of or in addition to adaptation that occurs at a user-device-specific level.

Process 1400 may then return to block 1410 such that the new query content is transmitted via the stream or repeated transmission. In various embodiments, the new query content may be transmitted (directly or indirectly) to one or more same user devices from which the responsive data sets were received or to one or more other user devices.

Figure 15:
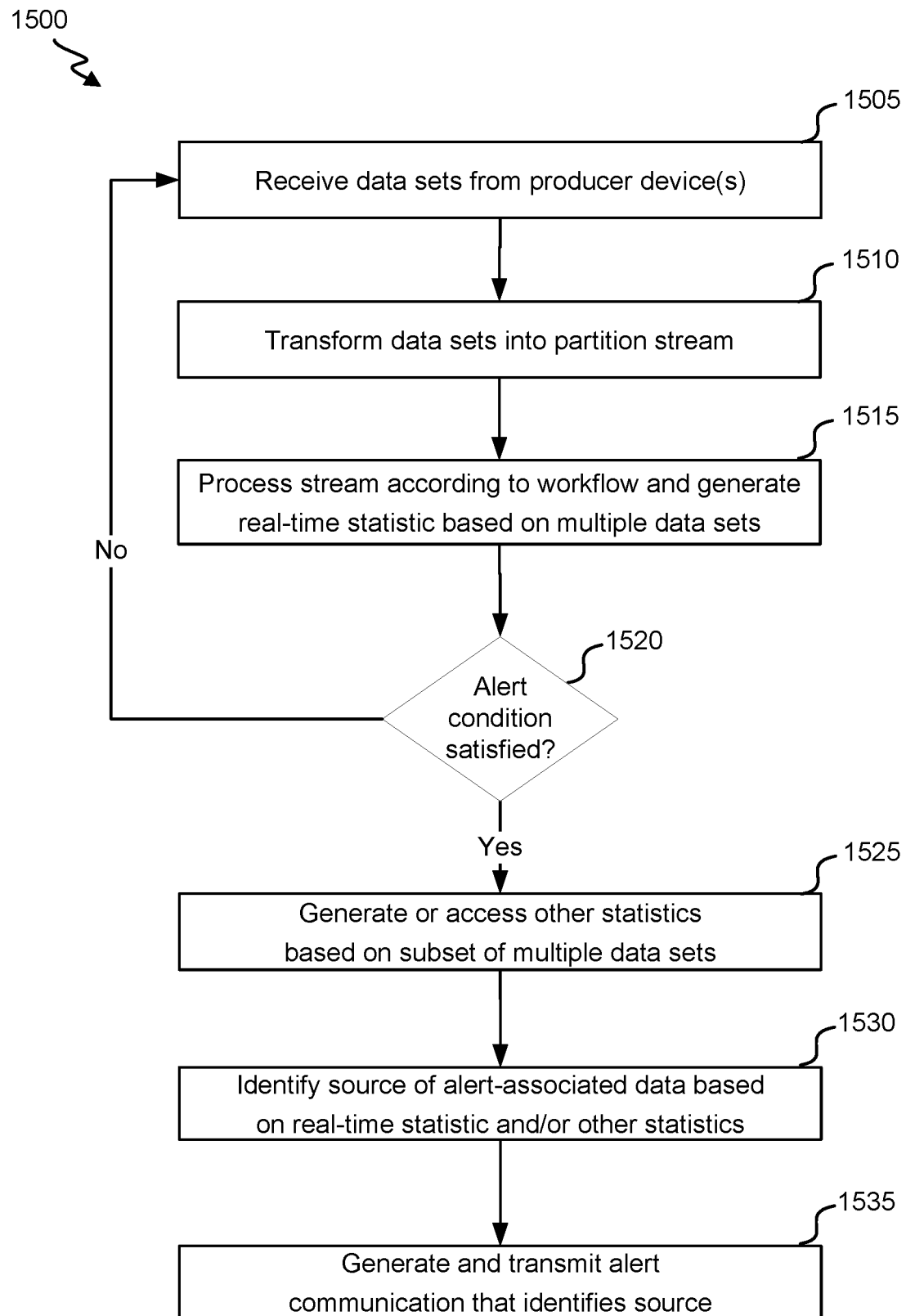
FIG. 15 illustrates a flowchart of an embodiment of a process for generating alerts in response to real-time partition-based scoring of data sets.

FIG. 15 illustrates a flowchart of an embodiment of a process 1500 for generating alerts in response to real-time partition-based scoring of data sets. Part or all of process 1500 can be performed at a data processing network 600. Process 1500 begins at block 1505 where a plurality of data sets is received. The plurality of data sets may include a plurality of responses transmitted from a plurality of user devices (via the plurality of producer devices) to one or more same queries or different queries. The plurality of data sets can be received at a single time and/or at multiple times. The plurality of data sets can be received from a single producer device or from multiple producer devices.

At block 1510, the data sets are transformed so as to be part of a partition stream. The transformation can include, for example, applying a schema; modifying a formatting; aggregating response data with additional data (e.g., based on an identifier of a producer device). The transformation can also include generating or identifying an identifier of an element in the stream. The identifier may then be associated with other information, such as a time, producer-device identifier, etc.

At block 1515, the parts of the partition stream corresponding to the data sets are processed according to an applicable workflow. The processing can be performed by one or more task processors and can include a synchronized or asynchronized analysis of the data sets. The processing can produce a score for each data set, that may include a score for an individual response and/or query or a score for a particular set of responses and/or queries (e.g., that correspond to a particular user device; content object and/or subject). For example, a score can identify a portion of analyzed responses that correspond to those identified in a key The processing can further include generating a real-time statistic based on multiple data sets. The real-time statistic can include, for example, a mean, median, mode, percentage of scores above a threshold, percentage of scores below a threshold, range, standard deviation, variance, etc. based on scores associated with multiple user devices or a statistic (e.g., a percentage matching target responses) generated based on an aggregation of responses across the multiple data sets.

The real-time generation of the statistic can include, for example, a generation that is based on data sets received or processed within a defined recent time period (e.g., a current day, last hour, last month, etc.) and/or data sets received or processed since a defined time (e.g., 8 am on a current day).

At block 1520, a determination is made, based on the real-time statistic, as to whether an alert condition is satisfied. The alert condition can include a generally applicable condition or one that depends on (for example) a client, time, user characteristic, and/or content object. In some instances, the alert condition is defined at least in part based on input from a client device. The alert condition may include a threshold to compare the real-time statistic to, such that the condition is satisfied if the real-time statistic exceeds the threshold in a defined direction. In some instances, multiple real-time statistics are generated and each may be compared to a corresponding threshold.

When it is determined that the alert condition is not satisfied, process 1500 returns to block 1505 so as to continue to receive and process data sets. When it is determined that the alert condition is satisfied, process 1500 continues to block 1525 where one or more other scores are generated or accessed based on an incomplete subset of the multiple data sets. For example, if each of the first data sets corresponds to a user device within a particular state, block 1530 may include generating statistics for each of a plurality of districts, cities or institutions in the state.

At block 1530, a source of alert-associated data is identified based on the real-time statistic and/or the other statistics. For example, the source can be identified as one (e.g., a geographic location; institution; user characteristic; producer-device set or identity; etc.) associated with a highest statistic from amongst the other statistics and/or one (or each) statistic that is above a threshold (which may be the same or different, such as by being higher, than a threshold in the alert condition). In one instances, block 1525 is repeatedly performed, such that statistics that exceed a threshold initiate a drill down to generate a statistic for each of multiple subsets of data sets that corresponded to the threshold-exceeding statistic until (for example) a variability amongst the subset statistics is less than a variability threshold; at least a defined percentage of the subsets correspond to a threshold-exceeding variable; etc.

At block 1535, an alert communication is generated and transmitted. The alert communication may identify one or more characteristics (and/or identifiers) of the data sets that led to a determination that the alert communication was satisfied and/or the source identified at block 1530. The alert communication may identify which alert condition was satisfied and/or a value of the real-time statistic.

The alert communication can be transmitted to a client device (which may be the same as and/or associated with one or more producer devices). Which device the alert communication is transmitted to may be determined on the source identified at block 1530. For example, the alert communication may be transmitted to a device that is associated with user devices associated with data sets giving rise to satisfaction of the alert condition.

In some instances, satisfaction of the alert condition triggers a particular action. For example, generation or selection of query content may be adjusted (e.g., to provide content from another source or content associated with different topics or difficulty levels); provision of content objects (e.g., via a content distribution network) may be paused; a communication that triggers presentation of an instruction (e.g., identifying a protocol for providing responses) may be pushed to user devices; a network connection may be assessed; and so on. In such instances, an identification of the action may be provided as part of the alert communication. In some instances, an authorization input may be required (e.g., to have been received at a client device) prior to performing the action.

Techniques described herein support various advantages. The distributed and elastic task-processing system allows for a large quantity of data sets to be concurrently and quickly processed while efficiently allocating computational resources so as to reduce instances of idle processor commitment. Strategic workflow-iteration and task-specific analysis can further identify opportunities for parallel processing of data to further improve processing speed. Distributed task processing further provides scalable solutions, such that a data processing network may be dynamically resized to effectively process various volumes of data. Distributed processing also enables data to continue to be processed according to a workflow without needing to suspend processing for storage efforts, as task processors can transmit pertinent results prior to or while storing the same or other results (e.g., locally). Real-time analysis of processing variables (e.g., task latency, processor or memory usage, pending stream elements, etc.) can further facilitate strategic sizing and component-selection for a data processing network and strategic parallel-processing definitions. Real-time generations of statistics further facilitates population-based adaptation of content and/or population-based alert generations or alert-responsive actions.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for processing a plurality of data sets by using a distributed network to generate and process partitioned streams, the method comprising:
   receiving, by a message allocator processor of the distributed network, a first data set of the plurality of data sets from a producer device;
   identifying a partition stream for the first data set corresponding to a tag or characteristic;
   appending the first data set to the identified partition stream;
   assigning a first rank to the first data set appended to the identified partition stream, wherein the first rank is higher than a rank of any other data sets in the identified partition stream;
   transmitting the identified partition stream with the appended first data set to a first task processor, wherein the first task processor is configured to:
   receive the first data set assigned the first rank;
   compare the first rank with a second rank assigned to a second data set in the identified partition stream;
   determine that the second rank is greater than the first rank, wherein data sets of the identified partition stream with a lower rank are to be processed first;
   sequentially perform an assigned task to process each data set of the identified partition stream, wherein the first data set is processed to generate a first result before the second data set is processed, based at least in part on the second rank being greater than the first rank;
   append the first result to an inter-task stream, the inter-task stream used to directly transmit results from the first task processor to sequential task processors in a workflow to perform subsequent tasks;
   store the first result locally with the first task processor; and
   transmit the inter-task stream with the appended first result to a second task processor, wherein the second task processor processes the first result to generate a second result and stores the second result locally with the second task processor; and
   receiving the first result from the first task processor and a second result from the second task processor.

2. The method of claim 1, wherein the first data set comprises responses to one or more queries previously transmitted by the message allocator processor to the producer device.

3. The method of claim 1, wherein the first rank is determined based on a reverse-based scheduling technique.

4. The method of claim 1, wherein the assigned task includes at least one of verifying authorization, estimating a completion, and identifying a provided response.

5. The method of claim 1, wherein the first result from the first task processor and the second result from the second task processor are binary.

6. The method of claim 1, wherein the first result from the first task processor and the second result from the second task processor are generated and transmitted in real-time.

7. A method, comprising
   receiving, by a message allocator processor of a distributed network, a first data set of a plurality of data sets from a producer device;
   identifying a partition stream for the first data set corresponding to a tag or characteristic;
   appending the first data set to the identified partition stream;
   assigning a first rank to the first data set appended to the identified partition stream, wherein the first rank is higher than a rank of any other data sets in the identified partition stream;
   transmitting the identified partition stream with the appended first data set to a first task processor, wherein the first task processor is configured to:
   receive the first data set assigned the first rank;
   compare the first rank with a second rank assigned to a second data set in the identified partition stream;
   determine that the second rank is greater than the first rank, wherein data sets of the identified partition stream with a lower rank are to be processed first;
   sequentially perform an assigned task to process each data set of the identified partition stream, wherein the first data set is processed to generate a first result before the second data set is processed, based at least in part on the second rank being greater than the first rank;
   append the first result to an inter-task stream, the inter-task stream used to directly transmit results from the first task processor to sequential task processors in a workflow to perform subsequent tasks;
   store the first result locally with the first task processor; and
   transmit the inter-task stream with the appended first result to a second task processor, wherein the second task processor processes the first result to generate a second result and stores the second result locally with the second task processor; and
   receiving the first result from the first task processor and a second result from the second task processor.

8. The method of claim 7, wherein the first data set comprises responses to one or more queries previously transmitted by the message allocator processor to the producer device.

9. The method of claim 7, wherein the first rank Is determined based on a reverse-based scheduling technique.

10. The method of claim 7, wherein the assigned task includes at least one of verifying authorization, estimating a completion, and identifying a provided response.

11. The method of claim 7, wherein the first result from the first task processor and the second result from the second task processor are binary.

12. The method of claim 7, wherein the first result from the first task processor and the second result from the second task processor are generated and transmitted in real-time.

13. A system, comprising:
a distributed network including a plurality of server computers; and
a memory storing Instructions that when executed by one or more server computers in the plurality of server computers cause the distributed network to perform the steps of:
receiving, by a message allocator processor of the distributed network, a first data set of a plurality of data sets from a producer device;
identifying a partition stream for the first data set corresponding to a tag or characteristic;
appending the first data set to the identified partition stream;
assigning a first rank to the first data set appended to the identified partition stream, wherein the first rank is higher than a rank of any other data sets in the identified partition stream;
transmitting the identified partition stream with the appended first data set to a first task processor, wherein the first task processor is configured to:
receive the first data set assigned the first rank;
compare the first rank with a second rank assigned to a second data set in the identified partition stream;
determine that the second rank is greater than the first rank, wherein data sets of the identified partition stream with a lower rank are to be processed first;
sequentially perform an assigned task to process each data set of the identified partition stream, wherein the first data set is processed to generate a first result before the second data set is processed, based at least in part on the second rank being greater than the first rank;
append the first result to an inter-task stream, the inter-task stream used to directly transmit results from the first task processor to sequential task processors in a workflow to perform subsequent tasks;
store the first result locally with the first task processor; and
transmit the inter-task stream with the appended first result to a second task processor, wherein the second task processor processes the first result to generate a second result and stores the second result locally with the second task processor; and
receiving the first result from the first task processor and a second result from the second task processor.

14. The system of claim 13, wherein the first data set comprises responses to one or more queries previously transmitted by the message allocator processor to the producer device.

15. The system of claim 13, wherein the first rank is determined based on a reverse-based scheduling technique.

16. The system of claim 13, wherein the assigned task includes at least one of verifying authorization, estimating a completion, and identifying a provided response.

17. The system of claim 13, wherein the first result from the first task processor and the second result from the second task processor are binary.

18. The system of claim 13, wherein the first result from the first task processor and the second result from the second task processor are generated and transmitted in real-time.

* * * * *